United States Patent
Ide

(10) Patent No.: US 7,535,505 B2
(45) Date of Patent: May 19, 2009

(54) IMAGING DEVICE AND A DIGITAL CAMERA HAVING SAME IN WHICH PIXEL SIGNALS READ FROM THE PIXEL BLOCK ARE HORIZONTALLY TRANSFERRED IN A COLLECTIVE FASHION

(75) Inventor: Hiroyuki Ide, Shijyonawate (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 861 days.

(21) Appl. No.: 10/709,908

(22) Filed: Jun. 4, 2004

(65) Prior Publication Data

US 2004/0208491 A1    Oct. 21, 2004

Related U.S. Application Data

(62) Division of application No. 09/441,233, filed on Nov. 16, 1999, now Pat. No. 6,809,770.

(30) Foreign Application Priority Data

Nov. 18, 1998    (JP) ................................. 10-328009

(51) Int. Cl.
  *H04N 9/083* (2006.01)
  *H04N 3/14* (2006.01)
  *H04N 5/335* (2006.01)
  *H04N 9/04* (2006.01)

(52) U.S. Cl. ........................ 348/282; 348/311; 348/312

(58) Field of Classification Search ................. 386/117; 348/273, 279, 280, 282, 283, 320–323
See application file for complete search history.

(56) References Cited

U.S. PATENT DOCUMENTS

| 5,309,247 | A | 5/1994 | Kinoshita et al. | 358/335 |
| 5,880,781 | A | 3/1999 | Udagawa et al. | 348/279 |
| 6,628,328 | B1 * | 9/2003 | Yokouchi et al. | 348/221.1 |
| 2002/0057354 | A1 * | 5/2002 | Yanai et al. | 348/273 |
| 2003/0156209 | A1 * | 8/2003 | Yanai | 348/272 |

FOREIGN PATENT DOCUMENTS

| JP | 10-200818 | 7/1998 |
| JP | 11-146408 | 5/1999 |

* cited by examiner

Primary Examiner—Tuan V Ho
Assistant Examiner—Chia-Wei A Chen
(74) Attorney, Agent, or Firm—Edwards Angell Palmer & Dodge LLP

(57) ABSTRACT

A digital camera including a CCD imager and a complementary color filter mounted on a light receiving surface thereof. The complementary color filter has color blocks each having 8 rows×4 columns while CCD imager has, at its light receiving surface, pixel blocks corresponding to those color blocks. The color block is assigned, in its each row, with all the kinds of color components, i.e., G, Mg, Ye and Cy, at least one in number per kind. A timing generator reads from respective columns pixel signals including all the kinds of color components at least one in number per kind, and transfers the read pixel signals in vertical direction. The timing generator also transfers the pixel signals in a horizontal direction each time vertical transfer by 8 rows has been completed.

6 Claims, 32 Drawing Sheets

| Ye | Cy | Ye | Cy | Ye |
|----|----|----|----|----|
| G  | Mg | G  | Mg | G  |
| Ye | Cy | Ye | Cy | Ye |
| G  | Mg | G  | Mg | G  |
| Ye | Cy | Ye | Cy | Ye |
| G  | Mg | G  | Mg | G  |
| Ye | Cy | Ye | Cy | Ye |
| G  | Mg | G  | Mg | G  |

| Ye | Cy | Ye | Cy | Ye |
|----|----|----|----|----|
| Mg | G  | Mg | G  | Mg |
| Ye | Cy | Ye | Cy | Ye |
| G  | Mg | G  | Mg | G  |
| Ye | Cy | Ye | Cy | Ye |
| Mg | G  | Mg | G  | Mg |
| Ye | Cy | Ye | Cy | Ye |
| G  | Mg | G  | Mg | G  |

1-BLOCK VERTICAL
TRANSFER
COMPLETED

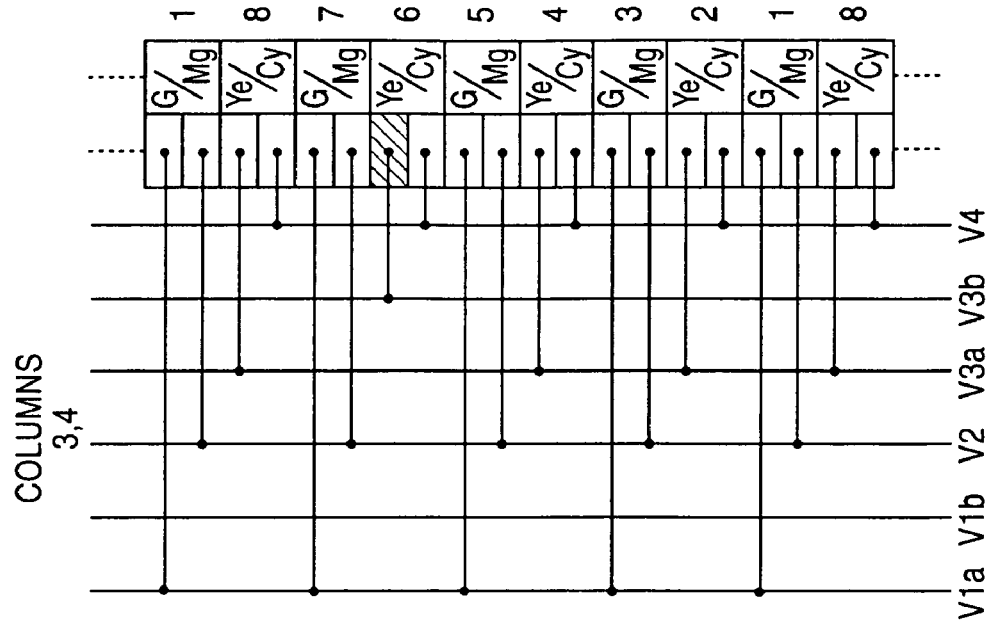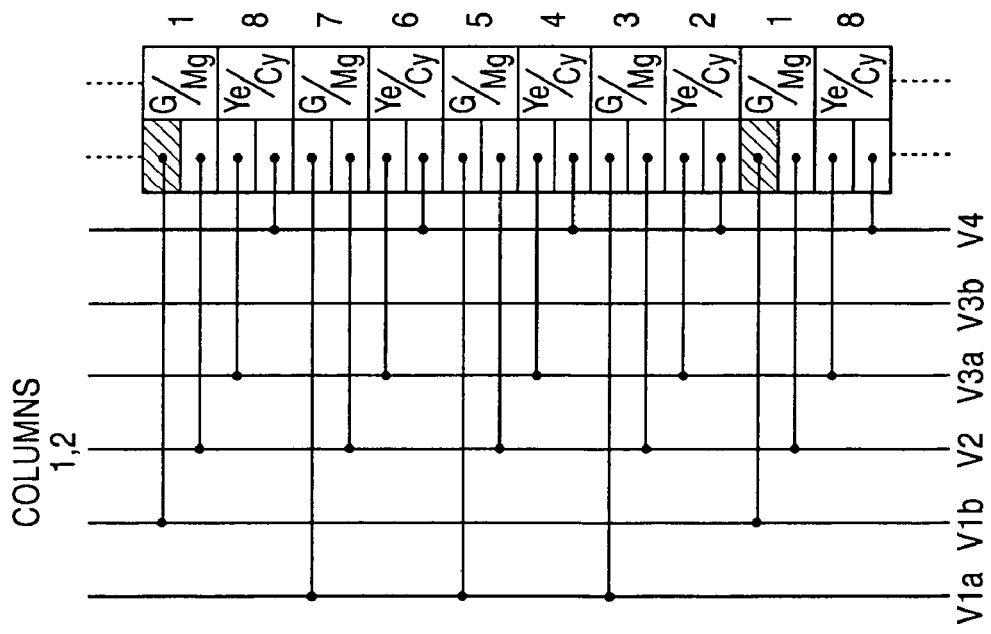

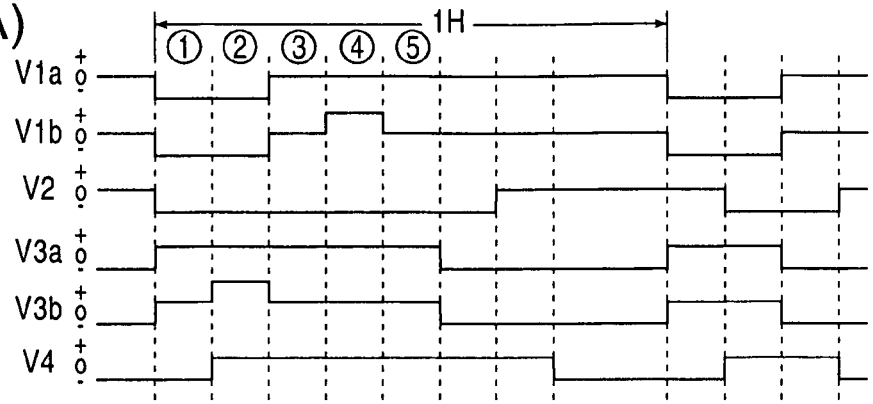

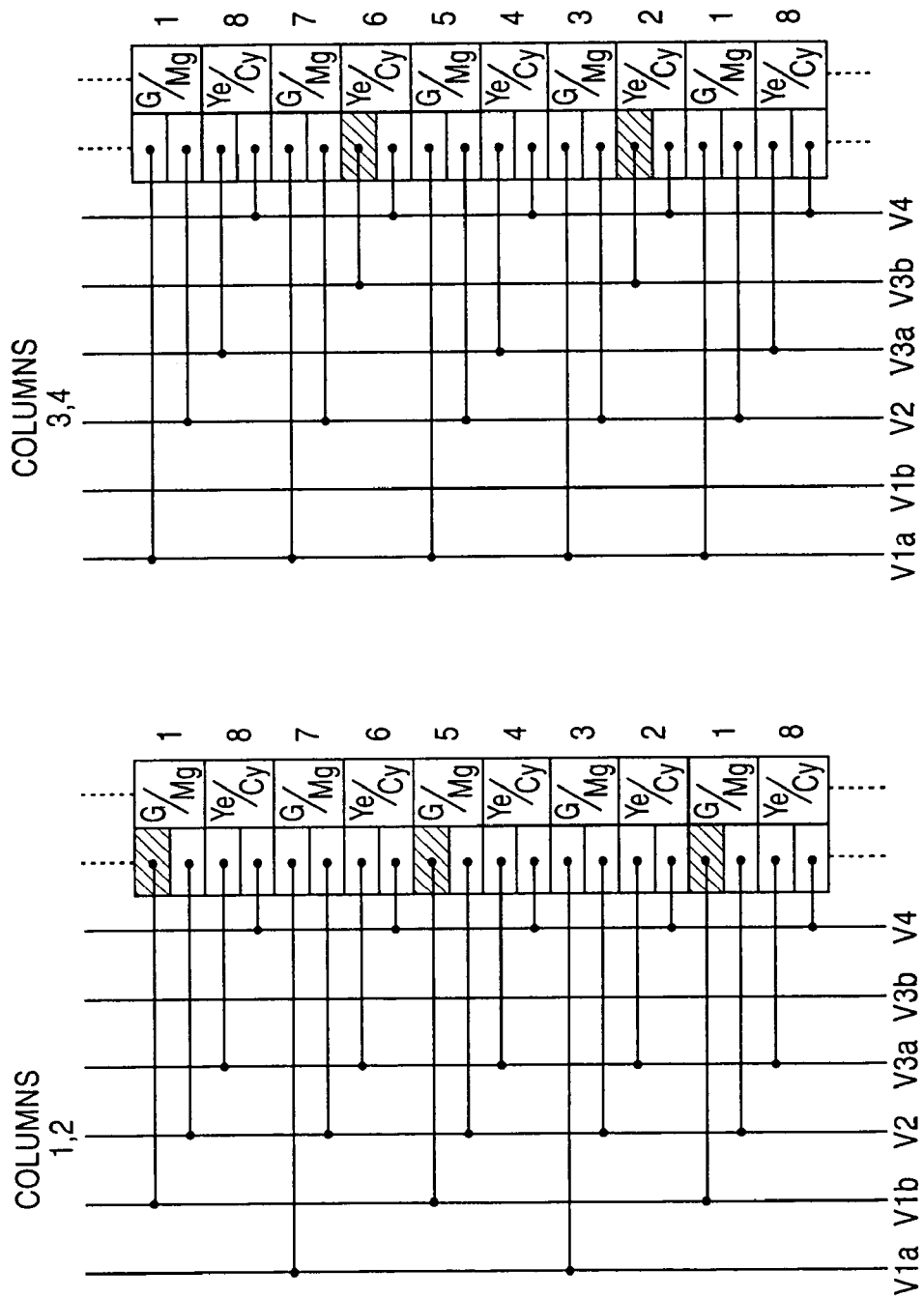

COLUMNS 1, 2

COLUMNS 3, 4

FIG. 13(B) COLUMNS 1, 2

FIG. 13(C) COLUMNS 3, 4

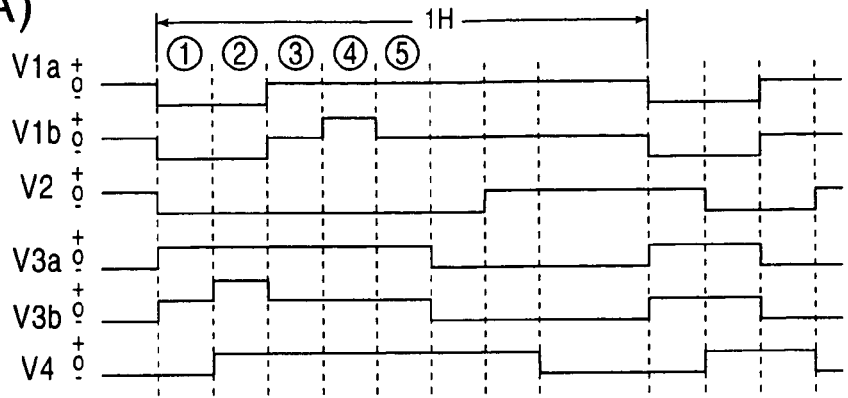

COLUMNS 1,2

COLUMNS 3,4

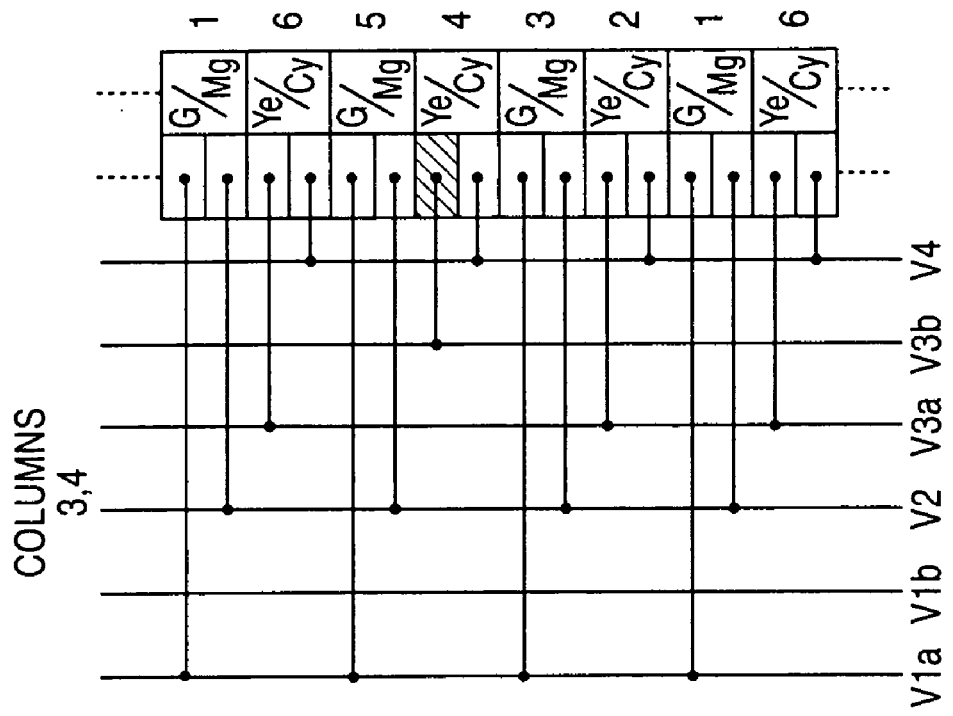
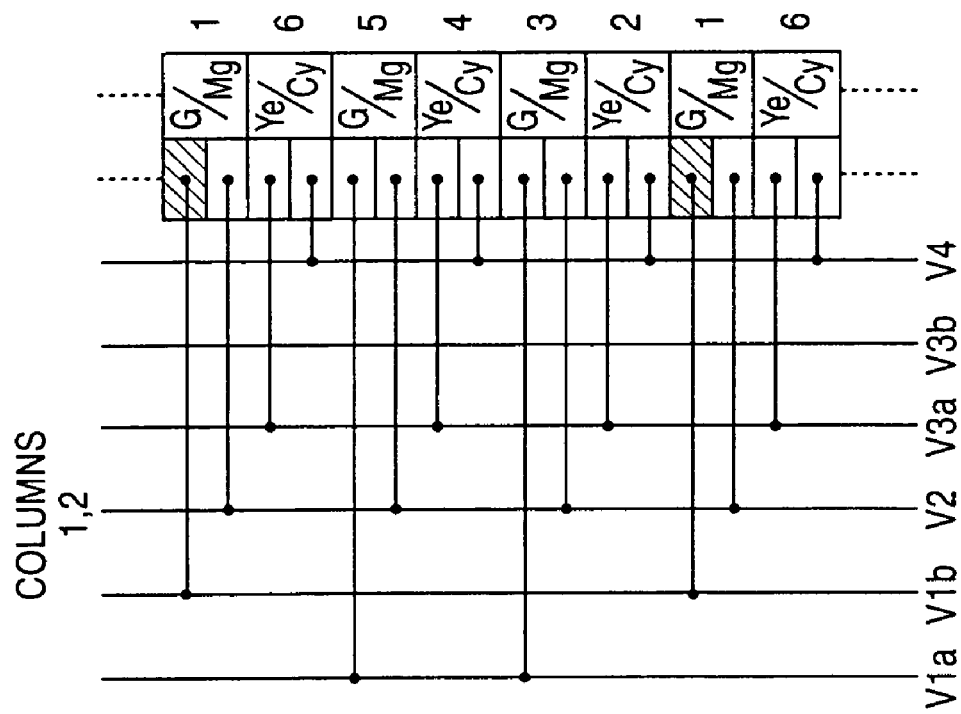

COLUMNS 1,2

COLUMNS 3, 4

IMAGING DEVICE AND A DIGITAL CAMERA HAVING SAME IN WHICH PIXEL SIGNALS READ FROM THE PIXEL BLOCK ARE HORIZONTALLY TRANSFERRED IN A COLLECTIVE FASHION

CROSS REFERENCE TO RELATED APPLICATIONS

This application is a divisional application of U.S. patent application Ser. No. 09/441,233 filed Nov. 16, 1999.

BACKGROUND OF THE INVENTION

1. Field of the Invention

This invention relates to imaging devices and, more particularly, to an imaging device which is applied, for example, for a digital camera having a plurality of pixel signals outputted through thinning out from a CCD imager.

This invention is also concerned with a digital camera having such an imaging device.

2. Description of the Prior Art

Referring to FIG. 32, a conventional imaging device has had a CCD imager that is mounted, at its front, with a complementary color filter having color components Ye, Cy, Mg and G so that pixel signals containing all kinds of complementary color components can be read from pixel blocks each having 2 pixels×8 lines. That is, G and Mg pixel signals are read from a first line of each pixel block, while Ye and Cy pixel signals are from a sixth line. The pixel signals thus read are then subjected to an interpolation process. As a result, thinned-out image signals are created wherein each pixel has all the color components.

In the prior art, however, there has been a problem that each pixel block requires twice horizontal transfers, consuming a considerable time in outputting pixel signals. This problem becomes more prominent as the number of pixel signals read from each pixel block is increased in order to improve resolution of the images having been thinned out.

SUMMARY OF THE INVENTION

It is therefore a primary object of the present invention to provide an imaging device which is reduced in time needed to output pixel signals.

Another object of the invention is to provide an imaging device which can output an increased number of pixel signals in a brief time.

A still another object of the invention is to provide a digital camera which is reduced in time needed to create an image.

A further object of the invention is to provide a digital camera which can create an image with increased resolution in a brief time.

An imaging apparatus according to the present invention, comprises: a color filter formed by a plurality of kinds of color elements; a CCD imager having pixels corresponding, in a one-to-one relation, to the color elements; and a timing generator for supplying a drive pulse to the CCD imager; wherein the color filter having color blocks formed by a plurality of rows each row having the plurality of kinds of color elements respectively assigned to the plurality of rows; the CCD imager having a plurality of rows of pixel blocks corresponding to the color blocks; the drive pulse including a read pulse to read from each of the plurality of rows pixel signals different in kind of said plurality of color elements, a vertical transfer pulse to cause vertical transfer of the pixel signals, and a horizontal transfer pulse to cause horizontal transfer of the pixel signals each time vertical transfer related to the number of vertical pixels of the pixel block has been completed.

In this invention, a color filter having a plurality of kinds of color elements is mounted on a light receiving surface of a CCD imager of an interline transfer scheme. The pixels of the CCD imager correspond, in a one-to-one relation, to color components of the color filter. The timing generator supplies a drive pulse to the CCD imager thus constructed. Here, the color filter has a plurality of rows of color blocks each row of which is assigned with the plurality of kinds of color elements at least one in number per kind. Also, the CCD imager has a plurality of rows of pixel blocks corresponding to the color blocks. If a read pulse is supplied to the CCD imager, pixel signals corresponding to different color elements are read from a plurality of rows forming the pixel block. The pixel signals read from the pixel block are vertically transferred by a vertical transfer pulse. Horizontal transfer is implemented according to a horizontal transfer pulse each time vertical transfer has been completed by the number of vertical pixels of the pixel block.

According to the invention, because the pixel signals read from the pixel block is horizontally transferred in a collective fashion, it is possible to reduce a time required for output as compared to the conventional, or to output much more pixel signals in a same time as that of the conventional.

According to one embodiment, the read pulse is a pulse to read one pixel of the pixel signals from each row of the pixel blocks.

According to another embodiment, the color block includes different kinds of color elements on a same row. Also, the read pulse includes a first read pulse to read from the plurality of rows pixel signals corresponding to one part of the plurality of kinds of color elements and a second read pulse to read from the plurality of rows pixel signals corresponding to the remaining part of the plurality of kinds of color elements.

According to yet another embodiment of the invention, the color block includes two pixels or more of a same kind of a color element on a same row, and the read pulse is a pulse to read a plurality of pixels of pixel signals from each row of the pixel block.

According to still another embodiment of the invention, the CCD imager has a plurality of pixel blocks, and the read pulse is a pulse to read the pixel signals from each of the pixel blocks in such a manner as to give an even distance between lines including pixels to be read out.

According to another embodiment of the invention, the color filter has one part of the plurality of kinds of color elements on an odd-numbered line and another part of the plurality of kinds of color elements on an even-numbered line. Preferably, the plurality of kinds of color elements are an element G, an element Mg, an element Ye and an element Cy, the element G and the element Mg being arranged alternately every pixel on one of the odd numbered and even numbered lines, and the element Ye and the element Cy being arranged alternately every pixel on the other of the odd numbered and even numbered lines.

A digital camera according to the present invention, comprises: a color filter formed by a plurality of kinds of color elements; a CCD imager having pixels corresponding, in a one-to-one relation, to the color elements; a timing generator for supplying a drive pulse to the CCD imager; and an interpolation circuit for performing interpolation on a pixel signal outputted from the CCD imager; wherein the color filter having color blocks formed by a plurality of rows having the plurality of kinds of color elements respectively assigned to the plurality of rows; the CCD imager having a plurality of rows of pixel blocks corresponding to the color blocks; the drive pulse including a read pulse to read from each of the plurality of rows pixel signals different in kind of the plurality of color elements, a vertical transfer pulse to cause vertical transfer of the pixel signals, and a horizontal transfer pulse to cause horizontal transfer of the pixel signals each time vertical transfer related to the number of vertical pixels of the pixel blocks has been completed.

In this invention, a color filter having a plurality of kinds of color elements is mounted on a light receiving surface of a CCD imager of an interline transfer scheme. The pixels of the CCD imager correspond, in a one-to-one relation, to color components of the color filter. The timing generator supplies a drive pulse to the CCD imager thus constructed. Responsive to the drive pulse, the pixel signals outputted from the CCD imager is interpolated by an interpolation circuit. Here, the color filter has a plurality of rows of color blocks each row of which is assigned with the plurality of kinds of color elements at least one in number per kind. Also, the CCD imager has a plurality of rows of pixel blocks corresponding to the color blocks. If a read pulse is supplied to the CCD imager, pixel signals corresponding to different color elements are read from a plurality of rows forming the pixel block. The pixel signals read from the pixel block are vertically transferred by a vertical transfer pulse. Horizontal transfer is implemented according to a horizontal transfer pulse each time vertical transfer has been completed by the number of vertical pixels of the pixel block.

According to one embodiment, an image corresponding to an output of the interpolation circuit is displayed on a monitor.

According to this invention, because the pixel signals read from the pixel block are horizontally transferred in a collective fashion, it is possible to reduce a time required to create one scene of thinned-out image as compared to the conventional, or to create a thinned-out image with improved resolution in a same time as that of the conventional.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing one example of a complementary color filter;

FIG. 3 is an illustrative view showing another example of a complementary color filter;

FIG. 6(A) is an illustrative view showing one part of the CCD imager shown in FIG. 5;

FIG. 6(B) is an illustrative view showing another part of the CCD imager shown in FIG. 5;

FIG. 7(A) is a timing chart showing operation of drive pulses;

FIG. 7(B) is an illustrative view showing a state of charge transfer;

FIG. 7(C) is an illustrative view showing a state of charge transfer;

FIG. 9(A) is an illustrative view showing one part of the CCD imager shown in FIG. 8;

FIG. 9(B) is a illustrative view showing another part of the CCD imager shown in FIG. 8;

FIG. 13(B) is an illustrative view showing a state of charge transfer;

FIG. 13(C) is an illustrative view showing a state of charge transfer;

FIG. 19(A) is a timing chart showing operation of drive pulses;

FIG. 19(B) is an illustrative view showing a state of charge transfer;

FIG. 19(C) is an illustrative view showing a state of charge transfer;

FIG. 30(A) is an illustrative view showing one part of the CCD imager shown in FIG. 29;

FIG. 30(B) is an illustrative view showing another part of the CCD imager shown in FIG. 29;

DETAILED DESCRIPTION OF THE PREFERRED EMBODIMENTS

Figure 1:
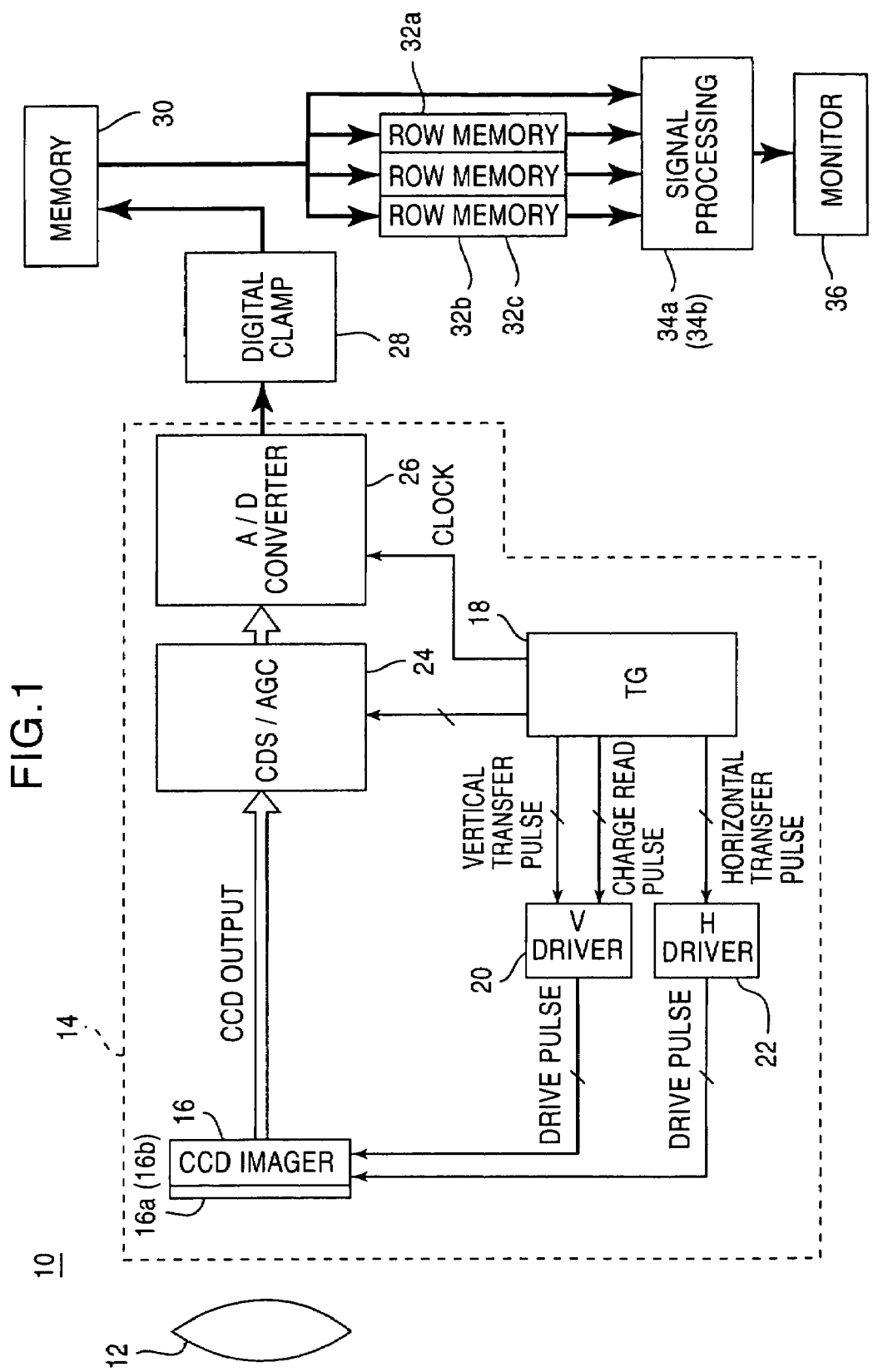
FIG. 1 is a block diagram showing an embodiment of the present invention.

Referring to FIG. 1, a digital camera 10 of this embodiment includes an optical lens 12. An optical image of a subject given through the optical lens 12 is taken in a vertically-inverted position to a CCD imager 16 that is of an interline transfer scheme provided inside an imaging apparatus 14. The CCD imager 16 is mounted, on its light receiving surface, with a complementary color filter 16a shown in FIG. 2 so that each light receiving element (sensor) can create a pixel signal having any of color components Ye, Cy, Mg and G.

In a camera mode to display real-time motion images (through-images) on a monitor 36, a timing generator (TG) 18 reads out pixel signals due to thinning out. As a consequence, only the pixel signals created on particular light receiving elements are read out of the CCD imager 16 and supplied to a CDS/AGC circuit 24. The pixel signals are subjected to well-known noise removal and level adjustment by the CDS/AGC circuit 24, and the pixel signals thus processed are converted by an A/D converter 26 into pixel data as a digital signal.

The pixel data is stored into a memory 30 through a digital clamp circuit 28, and thereafter read therefrom. The read pixel data is inputted directly or through line memories 32a-32c to a signal processing circuit 34a. The signal processing circuit 34a performs interpolation on the pixel data and creates pixel data that each pixel contain all the 4 color components. The signal processing circuit 34 also performs RGB conversion and YUV conversion on the interpolated pixel data, and outputs the obtained YUV data to the monitor 36. As a result, through-images are displayed on the monitor 36.

Incidentally, if an operator depresses a shutter button (not shown), the TG18 performs so-called all pixel read out. As a result, a still image is obtained that is improved in resolution over that in the camera mode.

Referring to FIG. 2, the complementary color filter 16a includes color components Ye, Cy, Mg and G. These color components correspond to the pixels of the CCD imager 16, so that each light receiving element of the CCD imager 16 can create a pixel signal having any one color component. Observing the complementary color filter 16a of FIG. 2 along a horizontal direction, G and Mg are alternately arranged every other pixel on an odd-numbered line, while Ye and Cy are alternately arranged every other pixel on an even-numbered line. Meanwhile, looking the complementary color filter 16a in a vertical direction, G and Ye are alternately arranged every other pixel on an odd-numbered vertical row, while Mg and Cy are alternately arranged every other pixel on an even-numbered vertical row. This means that the complementary color filter 16a includes a plurality of matrixes each having vertically 2 pixels and horizontally 2 pixels (2×2 matrix). The complementary color filter 16a thus structured is mounted on the CCD imager 16.

Figure 5:
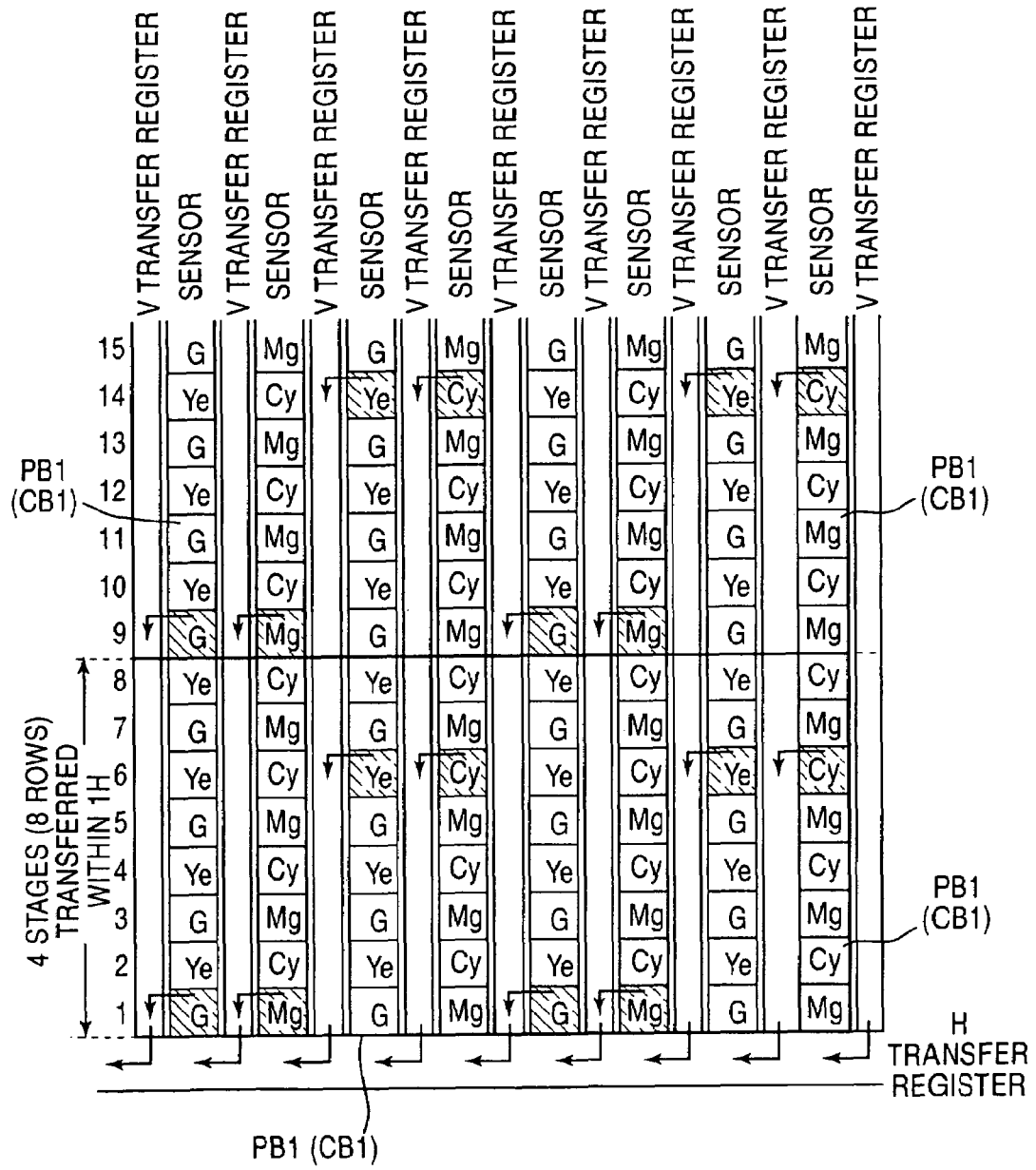
FIG. 5 is an illustrative view showing operation of the CCD imager.

Referring to FIG. 5, it is considered in this embodiment that the complementary color filter 16a is a gathering of color blocks CB1 each having 8 lines×4 rows while the CCD imager 16 a gathering of corresponding pixel blocks CB1 to the color blocks CB1. Each block is assigned, on each row, with all the color components of at least one in number per color. A common process is applied to these blocks. Specifically, in each block, pixel signals at line 1 are read from rows 1 and 2, and pixel signals at line 6 are read from rows 3 and 4. Each read pixel signal possesses color components G, Mg, Ye and Cy. These pixel signals are vertically transferred, and then horizontally transferred in a collective fashion at a time that 4 pixel signals have been collected on a horizontal transfer register. As a result, the G, Mg, Ye and Cy pixel signals obtained from a same block are outputted from the CCD imager 16 due to once horizontal transfer.

As shown in FIG. 6(A) and FIG. 6(B), each light receiving element is assigned with two vertical transfer registers. Each vertical transfer register is given any one of drive pulses V1a, V1b, V2 and V3a, V3b and V4. These drive pulses are all created by a V driver 20 based on a vertical transfer pulse and charge read pulse outputted from the TG18.

As can be understood from FIG. 6(A), for the G/Mg pixels on rows 1 and 2, a drive pulse V1a or V1b is applied to one vertical transfer register while a drive pulse V2 is to the other vertical transfer register. In this embodiment, because for rows 1 and 2 the G and Mg pixels on line 1 are to be thinned out, the drive pulse V1b is supplied only to the pixels on line 1. For the Ye/Cy pixels on rows 1 and 2, a drive pulse V is applied to one vertical transfer register while a drive pulse V4 is to the other vertical transfer register. Note that there is no case of using a drive pulse V3b for rows 1 and 2.

Referring to FIG. 6(B), on rows 3 and 4, other drive pulses than the drive pulse V1b are applied to a predetermined vertical transfer register. That is, a drive pulse V1a is applied to a vertical transfer register for one of the G/Mg pixels, while a pulse V2 is to the other vertical transfer register. Also, a drive pulse V3a or V3b is applied to a vertical transfer register for one of Ye, Cy pixels, while a drive pulse V4 is to the other vertical transfer register. In this embodiment, because the Ye/Cy pixels on line 6 of rows 3 and 4 are to be read out, the drive pulse V3b is supplied only to the pixel on line 6.

In order to allow for all-the-pixels reading and thinning out, two drive pulses V1a and V1b are assigned to one of the vertical transfer registers for the G/Mg pixels on rows 1 and, while two drive pulses V3a and V3b are one of the vertical transfer registers for the Ye/Cy pixels on rows 3 and 4. The drive pulses V1b and V3b are assigned respectively to the G/Mg pixels and Ye/Cy pixels to be thinned out and read out. This is true for other embodiment in respect of assigning the drive pulses V1a and V1b and the drive pulses V3a and V3b in a manner as stated above.

The drive pulses V1a, V1b, V2, V3a, V3b and V4 vary as shown in FIG. 7(A). In a period ①, the drive pulses V3a and V3b assume a zero level and the remaining drive pulses all assume a minus level. In a duration ②, the drive pulse V3b changes to a plus level and the drive pulse V4 changes to the zero level. As a result, in each block, pixel signals are read from line 6 on rows 3 and 4, as shown in FIG. 7(C). That is, charges are read onto one of the vertical transfer registers on line 6 so that the read charges are stored on the two vertical transfer registers on the line 6. In a period ③, the drive pulses V1a, V1b and V3b change to the zero level. Due to this, charge reading is suspended and the charges read from line 6 is also stored onto a corresponding one of the vertical transfer registers to line 5.

The drive pulse V1b in a period ④ becomes a plus level with a result that, as shown in FIG. 7(B), pixel signals are read from line 1 on rows 1 and 2. That is, charges are read onto corresponding one vertical transfer register to the line 1. At this time, because the drive pulses V3a and V4a are zero in level, the read charges are also stored to corresponding two vertical transfer registers to the line 2. When a period ⑤ is reached, the drive pulse V1b becomes a zero level thus suspending the charge reading. The pixel signals read from line 1 on the rows 1 and 2 as well as the line 6 on the rows 3 and 4 are vertically transferred in a separate fashion in or after the period ⑤. Incidentally, the drive pulses V1b and V3b become a plus level when the charge read pulse outputted from the TG18 becomes a high level.

Figure 4A:
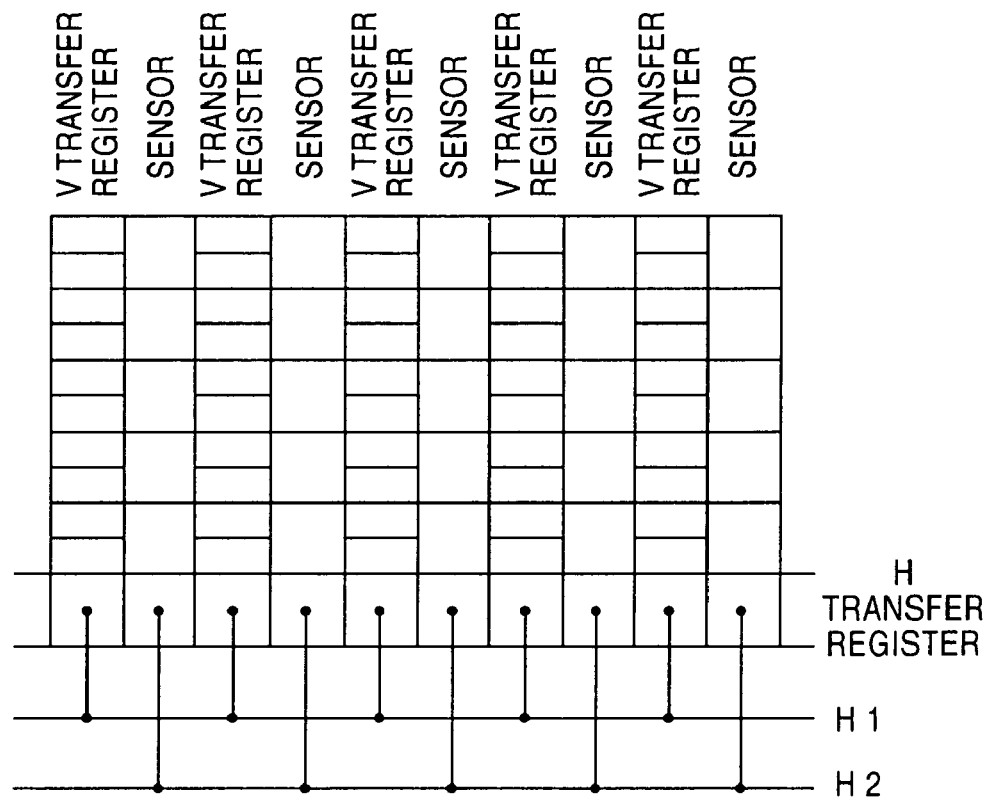
FIG. 4(A) is an illustrative view showing one part of a CCD imager.
Figure 4B:
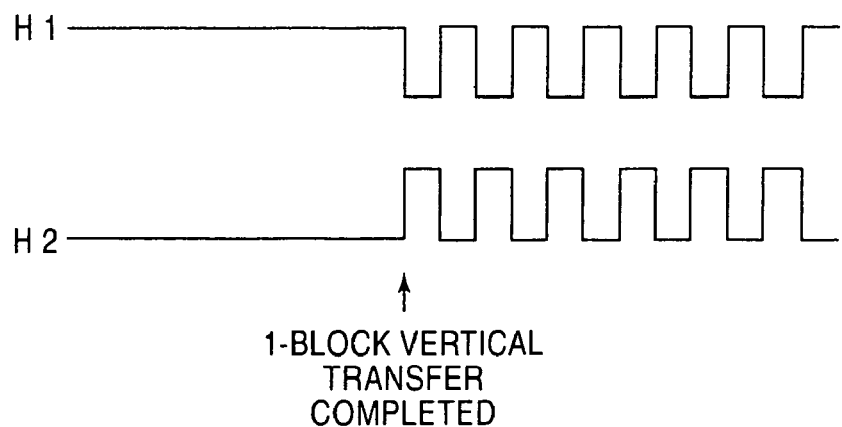
FIG. 4(B) is a timing chart showing operation of drive pulses.

Each time vertical transfer is completed by a corresponding distance to the number of vertical pixels within the block, drive pulses H1 and H2 shown in FIG. 4(B) are outputted from an H driver 22. The drive pulses H1 and H2 are reverse in polarity to each other, i.e. when one is in a high level the other assumes a low level. As shown in FIG. 4(A) the drive pulse H1 is applied to a horizontal transfer register provided at the ends of the vertical transfer registers. Meanwhile, the drive pulse H2 is supplied to a horizontal transfer register provided at the ends of the sensors. The vertical pulses H1 and H2 start changing in level at a time that vertical transfer by one block has completed. This causes pixel signals to be transferred in a horizontal direction. That is, the pixel signals created in the blocks are horizontally transferred in a collective fashion.

The signal processing circuit 34a performs interpolation on the corresponding pixel data to the pixel signals thus outputted. As a result, thinned-out image data is created that each pixel has all the color components.

In this embodiment, each clock requires only once horizontal transfer, thus reducing a time needed to read pixel signals as compared to that of the conventional. This means that assuming the number of pixels on the CCD imager 16 is the same as the conventional, the read time is reduced to a half of that of the conventional.

Figure 8:
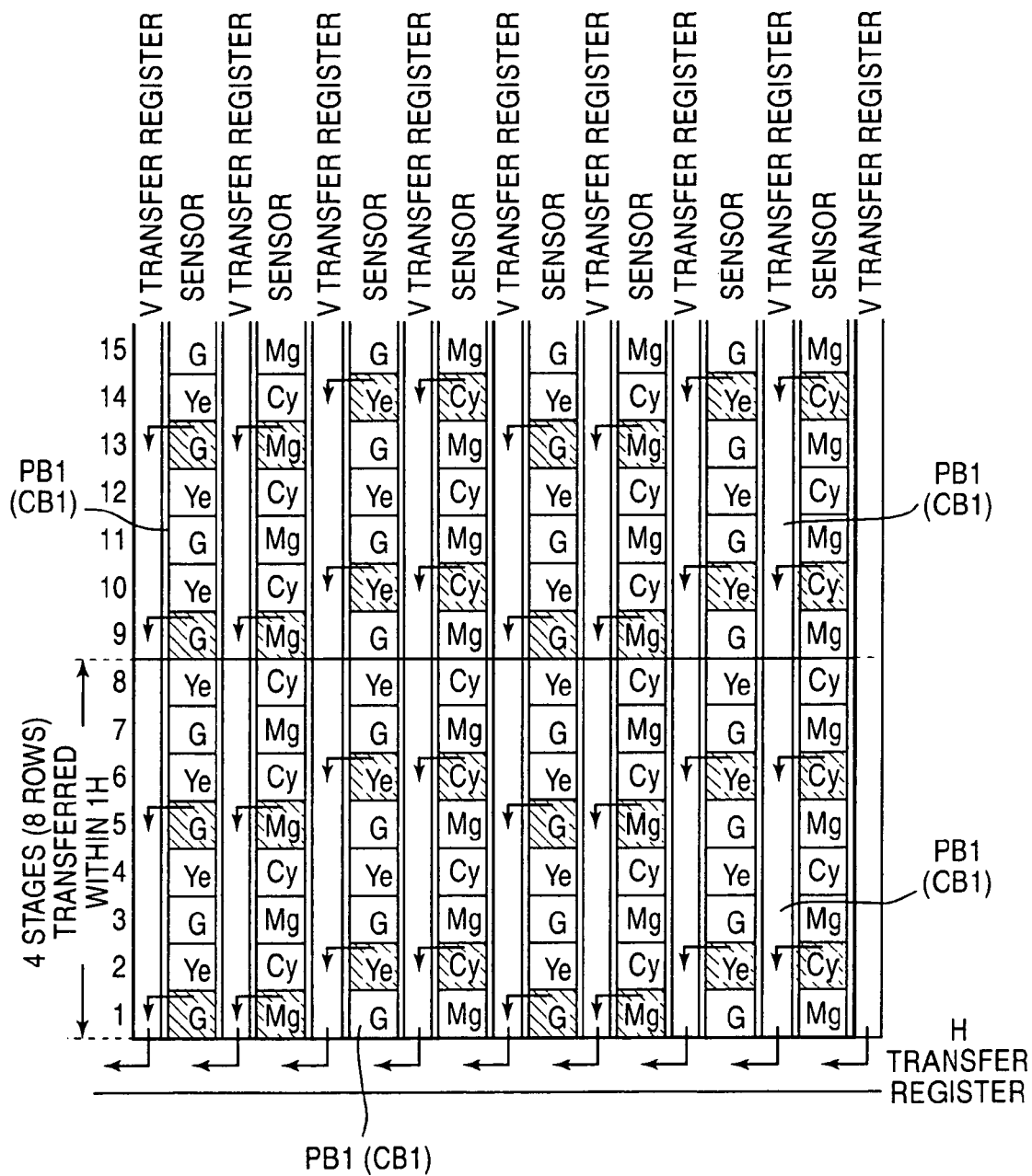
FIG. 8 is an illustrative view showing operation of another CCD imager.

FIG. 8 to FIG. 10 shows a modification to the CCD imager 16 of FIG. 1. In also this embodiment, the CCD imager 16 is mounted with a complementary color filter 16a. It is considered that this complementary filter 16a is a gathering of color blocks CD1 each having 8 lines×4 rows. Hence, the CCD imager 16 is also considered as a gathering of corresponding pixel blocks PB1 to the color blocks CB1. In this embodiment, however, in each block at lines 1 and 5 pixel signals are read from rows 1 and 2 while at lines 2 and 6 pixel signals are read from rows 3 and 4. In other words, two pixel signals per G, Mg, Ye and Cy are read from each block. The read pixel signals are vertically transferred in a separate fashion and accumulated on the horizontal transfer register. Horizontal transfer is performed once each time vertical transfers by 8 lines has been completed. Due to this, the pixel signals having a same color component are mixed with each other over the horizontal transfer register. Although the color component of the pixel signal to be outputted by once horizontal transfer changes in the order of G, Mg, Ye and Cy similarly to the FIG. 1 embodiment, the pixel signals have a nearly twice level as compared to those of the FIG. 1 embodiment.

Referring to FIG. 9(A) and FIG. 9(B), in also this embodiment each light emitting element is assigned with two vertical transfer registers, wherein each vertical transfer register is applied by one of drive pulses V1a, V1b, V2, V3a, V3b and V4.

However, at rows 1 and 2 there is a need to read pixel signals from lines 1 and 5. Accordingly, as will be understood from FIG. 9(A), a drive pulse V1a is applied to the G/Mg pixels on lines 3 and 7 while a drive pulse V1b is to the G/Mg pixels on lines 1 and 5. Also, at rows 3 and 4 there is a need to read pixel signals from lines 2 and 6. Accordingly, as shown in FIG. 9(B) a drive pulse V3a is supplied to lines 4 and 8 while a drive pulse V3b is to lines 2 and 6.

Figures 10A, 10B, 10C:
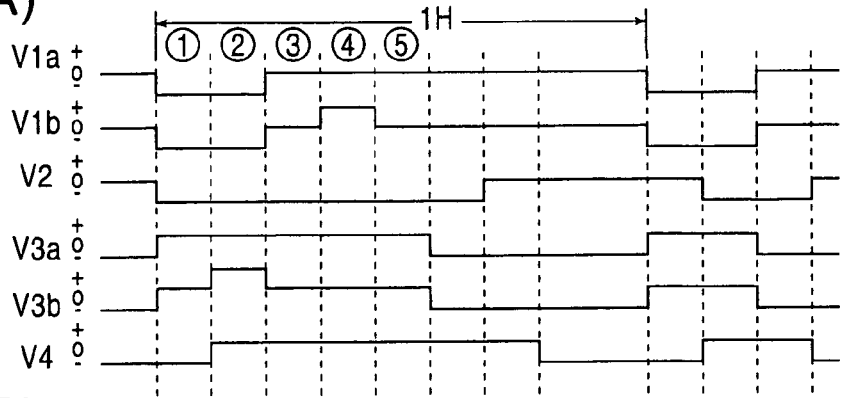
FIG. 10(A) is a timing chart showing operation of drive pulses.
FIG. 10(B) is an illustrative view showing a state of charge transfer.
FIG. 10(C) is an illustrative view showing a state of charge transfer.

The drive pulses V1a, V1b, V2, V3a, V3b and V4 vary as shown in FIG. 10(A). These changes are quite the same as those of FIG. 7(A). However, unlike the FIG. 1 embodiment, the drive pulse V1b is supplied also to line 5 on rows 1 and 2 while the drive pulse 3b is given also to line 2 on rows 3 and 4. Due to this, as shown in FIG. 10(B) and FIG. 10(C), charges are read also from line 5 on row 1 and 2 as well as from line 2 on the rows 3 and 4. The charges are vertically transferred in a separate fashion in and after a period ⑤.

Each time a pixel signal read from each block is accumulated onto the horizontal transfer register, drive pulses H1 and H2 shown in FIG. 4(B) are supplied to the horizontal transfer register. The pixel signal is transferred in a horizontal direction in response to the drive pulses H1 and H2. That is, 8 pixels of pixel signals created by each block are horizontally transferred in a collective manner. A signal processing circuit 34a performs interpolation similarly to the FIG. 1 embodiment. As a result, image data is created that has all the color components for each pixel.

According to this embodiment, the number of times of horizontal transfers for each block can be reduced to once and further the pixel signal is increased in level twice that of the conventional.

Figure 11:
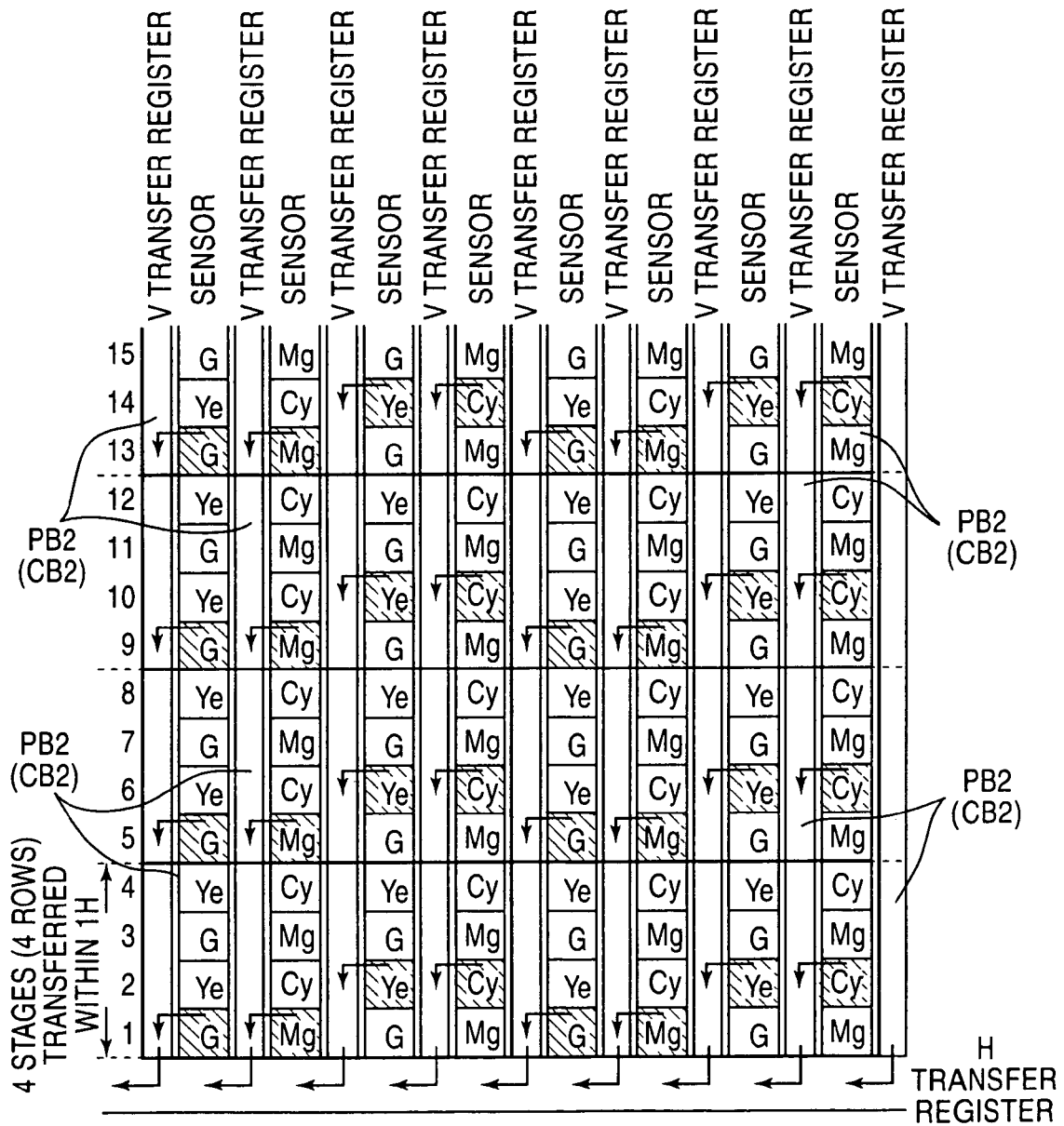
FIG. 11 is an illustrative view showing operation of another CCD imager.

FIG. 11 to FIG. 13 show another modification of a CCD imager 16. This CCD imager 16 is also amounted with a complementary color filter 16a. It however is considered that the complementary color filter 16a is a gathering of color blocks CB2 each having 4 lines×4 rows and the CCD imager 16 is a gathering of corresponding pixel blocks PB2 to the color blocks CB2. Every block is applied by a common process. That is, in each block, at line 1 pixel signals are read from rows 1 and 2, and at line 2 pixel signals are read from rows 3 and 4. The read pixel signals each has color components G, Mg, Ye and Cy. The pixel signals are vertically transferred. When 4 pixel signals have been collected onto a horizontal transfer register, i.e. when vertical transfer by 4 lines has been completed, these pixel signals are horizontally transferred in a collective fashion. As a result, the color components G, Mg, Ye and Cy are repeatedly included in the pixel signals outputted by once horizontal transfer.

Figure 12A:
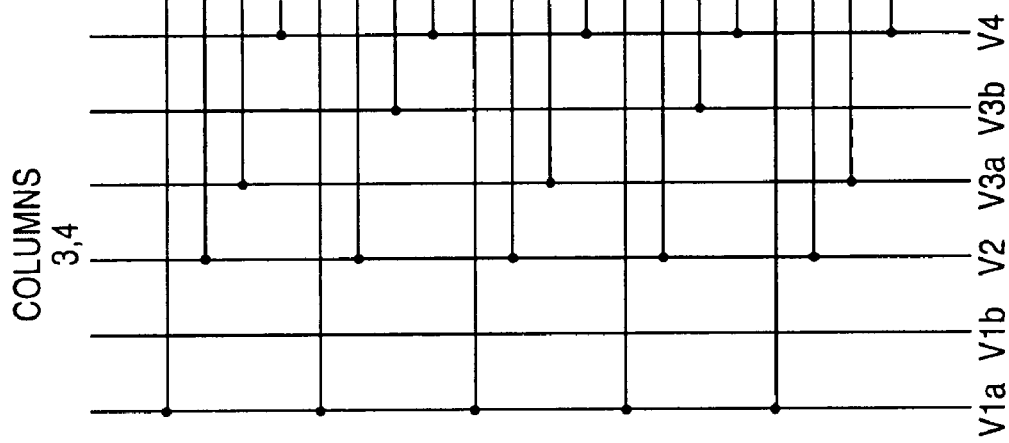
FIG. 12(A) is an illustrative view showing one part of the CCD imager shown in FIG. 11.
Figure 12B:
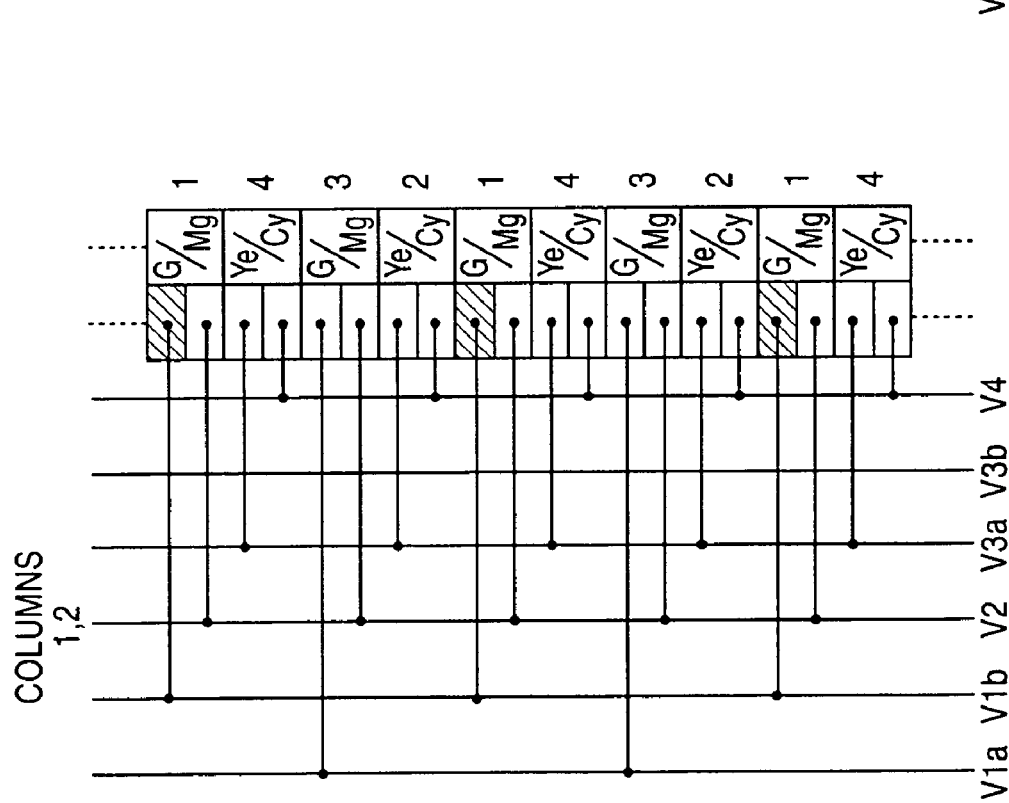
FIG. 12(B) is an illustrative view showing another part of the CCD imager shown in FIG. 11.

As shown in FIG. 12(A), on rows 1 and 2, a drive pulse V1b is applied to the G/Mg pixels on line 1 while a drive pulse V1a is to the G/Mg pixels on line 3. Also, as shown in FIG. 12(B) on rows 3 and 4, a drive pulse V3b is supplied to the Ye/Cy pixels on line 2 while a drive pulse V3a is to the Ye/Cy pixels on line 4.

Figure 13A:
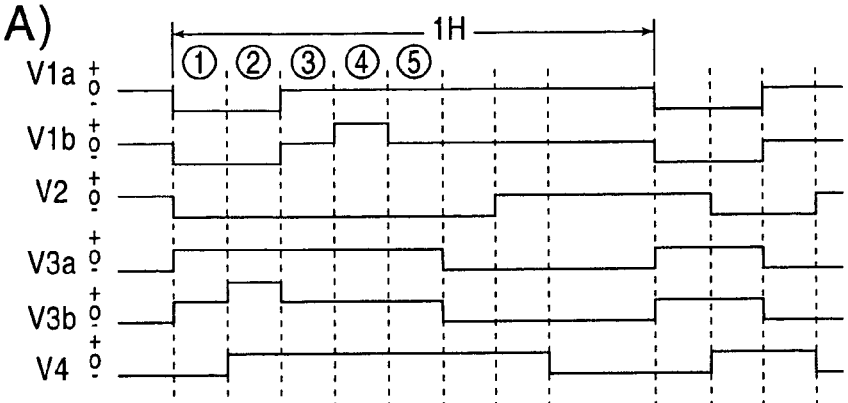
FIG. 13(A) is a timing chart showing operation of drive pulses.

The drive pulses V1a, V1b, V2, V3a, V3b and V4 vary as shown in FIG. 13(A). These changes are quite the same as those of FIG. 10(A). This embodiment and the embodiment of FIG. 8 to FIG. 10 are different in conception about the block but same in the pixels to be read out. Accordingly, the timings of charge read out and transfer shown in FIG. 13(B) and FIG. 13(C) are same as those of FIG. 10(B) and FIG. 10(C).

Because of the difference in conception about the block, horizontal transfer is conducted in different timing from that of the FIG. 8 to FIG. 10 embodiment. That is, in the FIG. 8 embodiment horizontal transfer is done each time pixel signals by 8 lines have been vertically transferred whereas in this embodiment horizontal transfer is conducted each time vertical transfer by 4 lines has been completed.

In the signal processing circuit 34a, interpolation is performed similarly to the above. As a result, image data is created that each pixel has all the color components.

According to this embodiment, there is increase in pixel signal reading time by the increase in the number of times of horizontal transfers. It however is possible to increase twice the vertical resolution of the thinned-out image signal as compared to that of the conventional.

Figure 14:
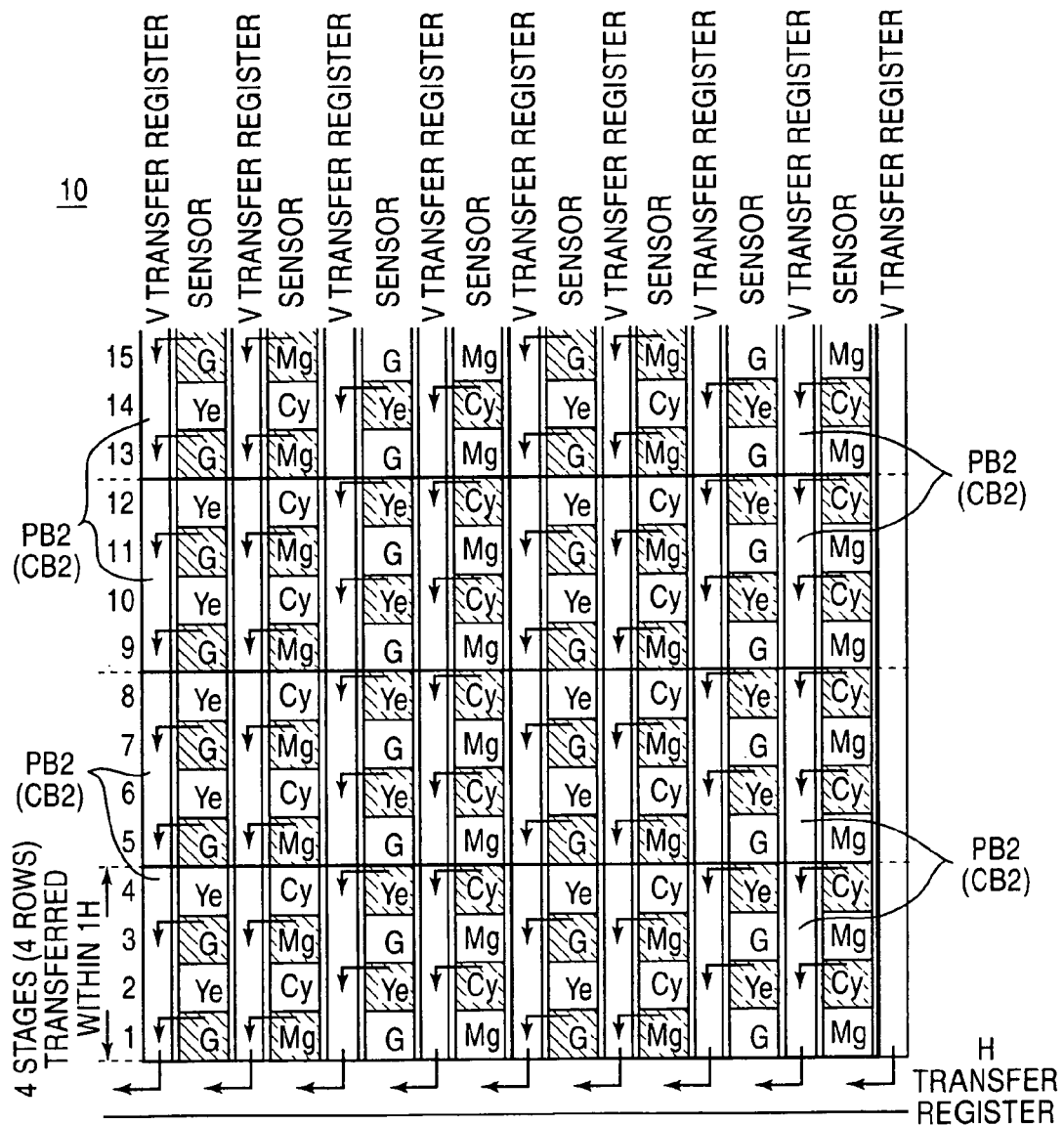
FIG. 14 is an illustrative view showing operation of another CCD imager.
Figure 15:
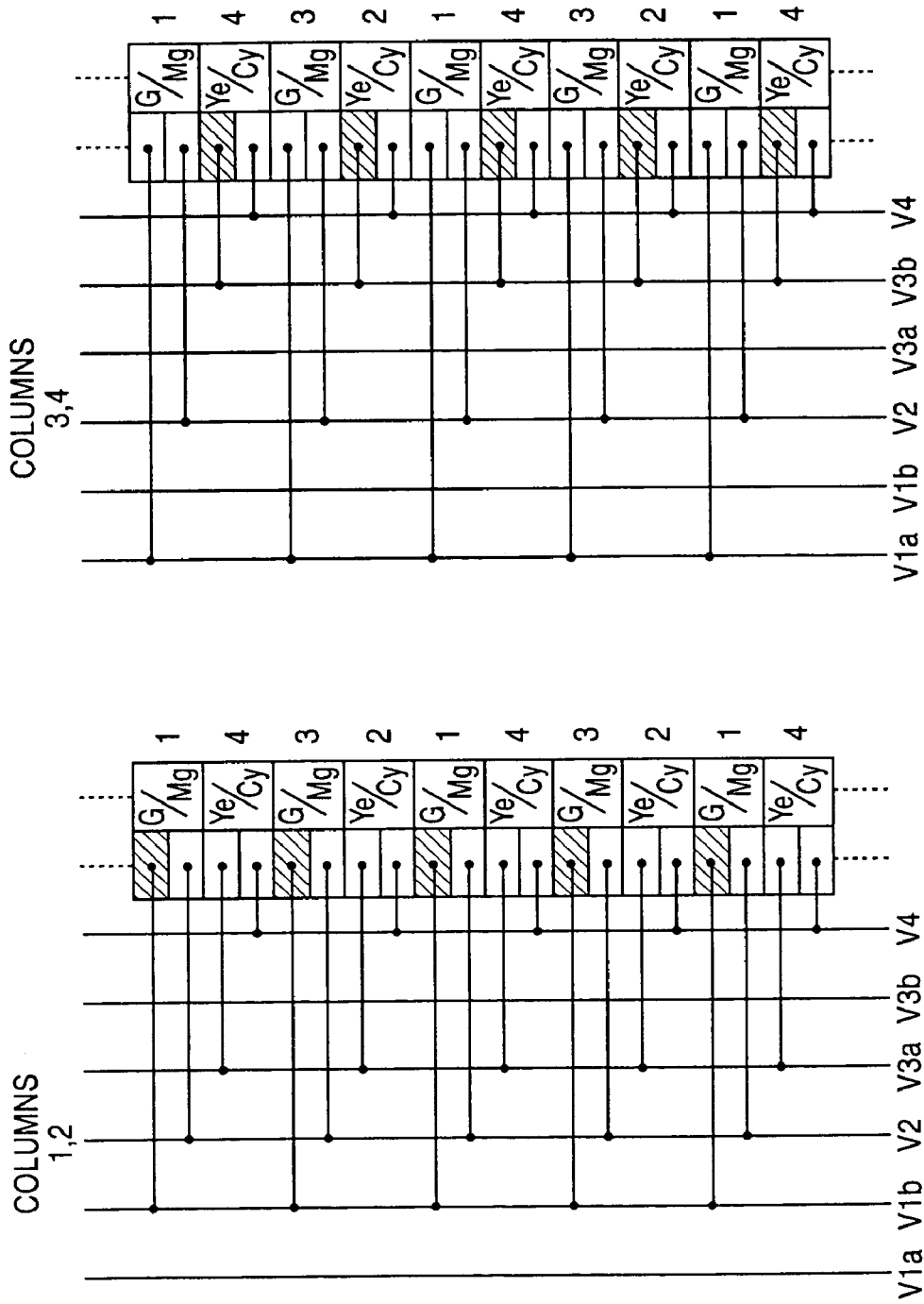
FIG. 15(A) is an illustrative view showing one part of the CCD imager shown in FIG. 14.
FIG. 15(B) is an illustrative view showing another part of the CCD imager shown in FIG. 14.
Figure 16:
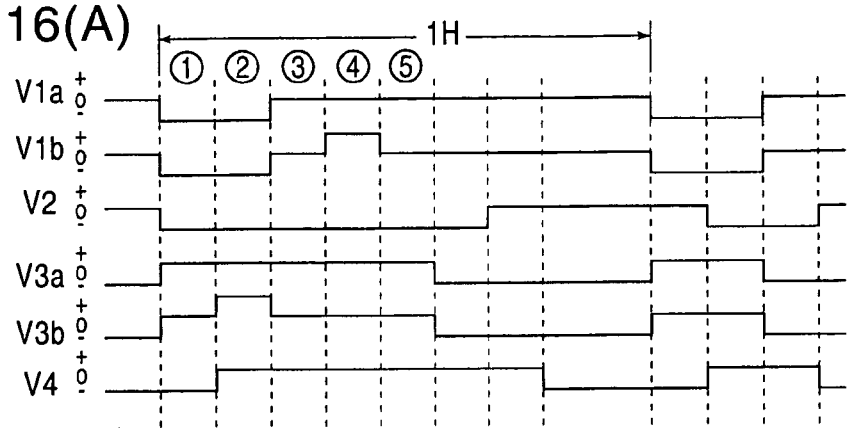
FIG. 16(A) is a timing chart showing operation of drive pulses.
FIG. 16(B) is an illustrative view showing a state of charge transfer.
FIG. 16(C) is an illustrative view showing a state of charge transfer.

FIG. 14 to FIG. 16 show a still another modification of a CCD imager 16. The CCD imager 16 is mounted with a complementary color filter 16a, similarly to the above. It can be considered that the complementary color filter 16a is a gathering of color block CB2 each having 4 lines×rows while the CCD imager 16 is a gathering of corresponding pixel blocks PB2 to the color blocks CB2. Every block is applied by a common process. However, in each block, on lines 1 and 3 pixel signals are read from rows 1 and 2, while on lines 2 and 4 pixel signals are read from lines 3 and 4. The read pixel signals each have color components G, Mg, Ye and Cy. The pixel signals are vertically transferred. When vertical transfer by 4 lines has been completed, the pixel signals are horizontally transferred in a collective fashion. Due to this, the pixel signals having a same color component are mixed with each other over a horizontal transfer register and then outputted from the CCD imager 16. Each pixel signal has a level twice that of the FIG. 11 to FIG. 13 embodiment.

In each block, on rows 1 and 2 a drive pulse V1b is applied to all the G/Mg pixels without using a drive pulse V1a, as shown in FIG. 15(A). On rows 3 and 4, on the other hand, a drive pulse V3b is applied to all the Ye, Cy pixels without using a drive pulse V3a, as shown in FIG. 13(B).

The drive pulses V1a, V1b, V2, V3a, V3b and V4 vary as shown in FIG. 16(A), similarly to those of FIG. 13(A). However, because a drive pulse V1b is applied to all the G/Mg pixels on rows 1 and 2, charges are read from both lines 1 and 3. Also, because the drive pulse V3b is applied to all the Ye/Cy pixels on rows 3 and 4, charges are read from both lines 2 and 4, as shown in FIG. 16(C).

The read charges are vertically transferred in a separate manner, and thereafter horizontally transferred in timing of once every 4 lines responsive to drive pulses H1 and H2. This means that the pixel signals possessing a same color component are mixed with each other over the horizontal transfer register, hence outputting mixed pixel signals. The output pixel signals vary in color component in the order of G, Mg, Ye and Cy, similarly to the above embodiment. The pixel data corresponding to the output pixel signals is interpolated by a signal processing circuit 34a. As a result, thinned-out image data is created that has each pixel has all the color components.

According to this embodiment, there is increase in time to read out a pixel signal because of increase in the number of times of horizontal transfers. It is however possible to improve twice the pixel signal level and thinned-out image data vertical resolution as compared to those of the conventional. Also, a returning characteristic is obtained constant because of an even distance between the line that G and Mg pixel signals are to be read out and the line that Ye and Cy pixel signals are to be read out. Thus, filtering is facilitated.

Figure 17:
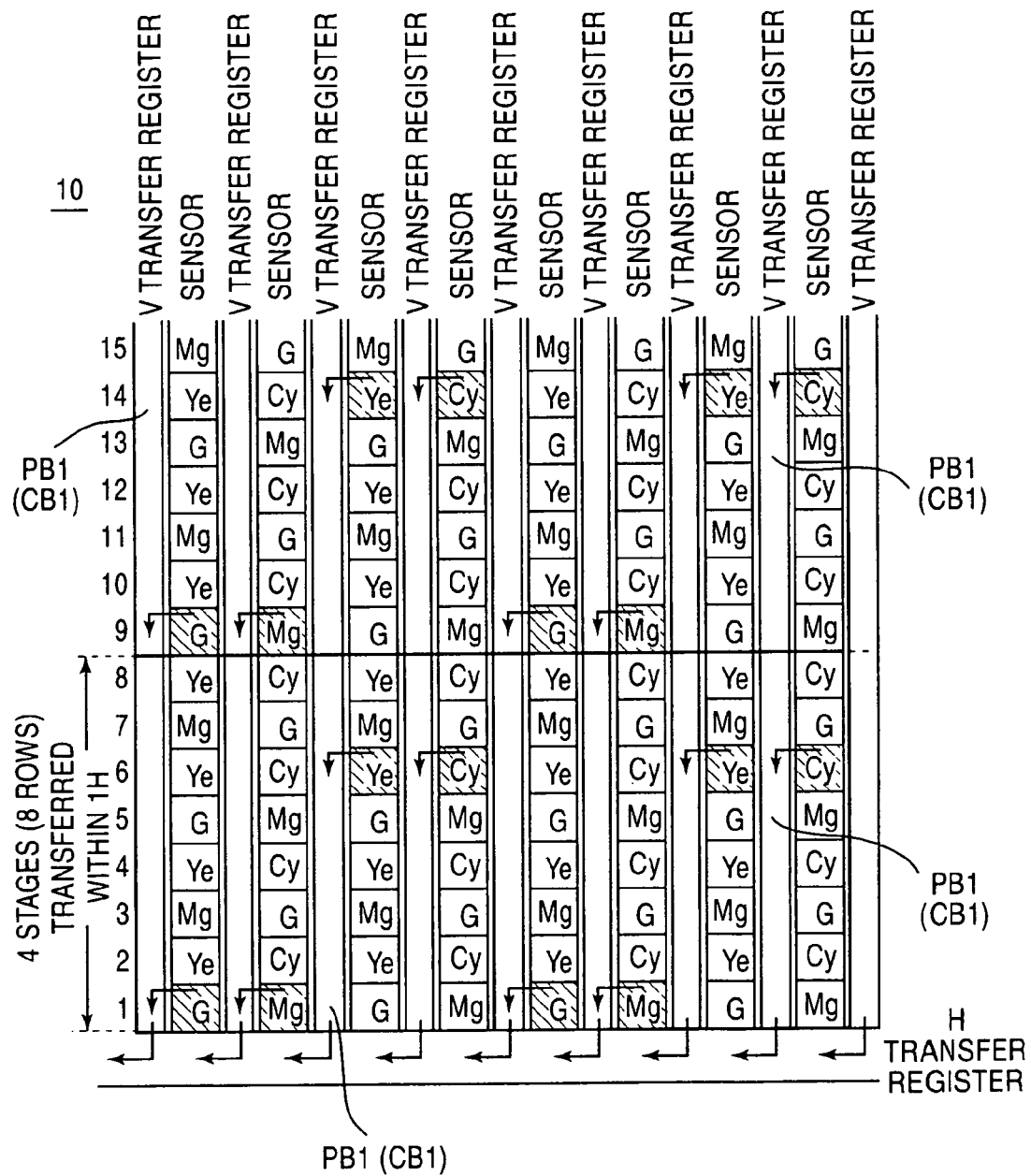
FIG. 17 is an illustrative view showing operation of another CCD imager.

Referring to FIG. 17 to FIG. 19, a CCD imager 16 of another modification is mounted with a complementary color filter 16b of FIG. 3. The complementary color filter 16b includes color components Ye, Cy, Mg and G similarly to the complementary color filter 16a. These color components correspond to pixels on the CCD imager 16. When observing the complementary color filter 16b along a horizontal direction, on an odd-numbered line are alternately arranged G and Mg every other pixel while on an even-numbered line are alternately arranged Ye and Cy every other pixel, similarly to the complementary color filter 16a. However, Mg and G are inverted in position on every odd-numbered line. Where the color component on an odd-numbered line being considered varies as Mg, G, Mg, G . . . , the color components on a preceding and succeeding odd-numbered lines vary as G, Mg, G, Mg . . . . Consequently, when observing the complementary color filter 16b along a vertical direction, the color components are arranged in the order of G, Ye, Mg and Ye on an odd-numbered row, while on an even-numbered row the color components are arranged in the order of Mg, Cy, G and Cy. This means that the complementary color filter 16b is formed with a plurality of matrixes (2×4 matrix) each having vertically 2 pixels and horizontally 4 pixels. The complementary color filter 16b thus configured is mounted on the CCD imager 16.

Referring to FIG. 17, it is considered in this embodiment that the complementary color filter 16b is a gathering of color blocks CB1 each having 8 lines×4 rows while CCD imager 16 is a gathering of corresponding pixel blocks PB1 to the color blocks CB1. In each block, on line 1 pixel signals are read from rows 1 and 2 while on line 6 pixel signals are read from rows 3 and 4. That is, pixel signals of one in number per G, Mg, Ye and Cy are read out of each block. The read pixel signals are vertically transferred in a separate fashion, and accumulated onto a horizontal transfer register. The horizontal transfer is carried out each time vertical transfer by 1 line has been completed. As a result, the pixel signals outputted in one horizontal transfer vary in color component in the order of G, Mg, Ye and Cy.

Figure 18A:
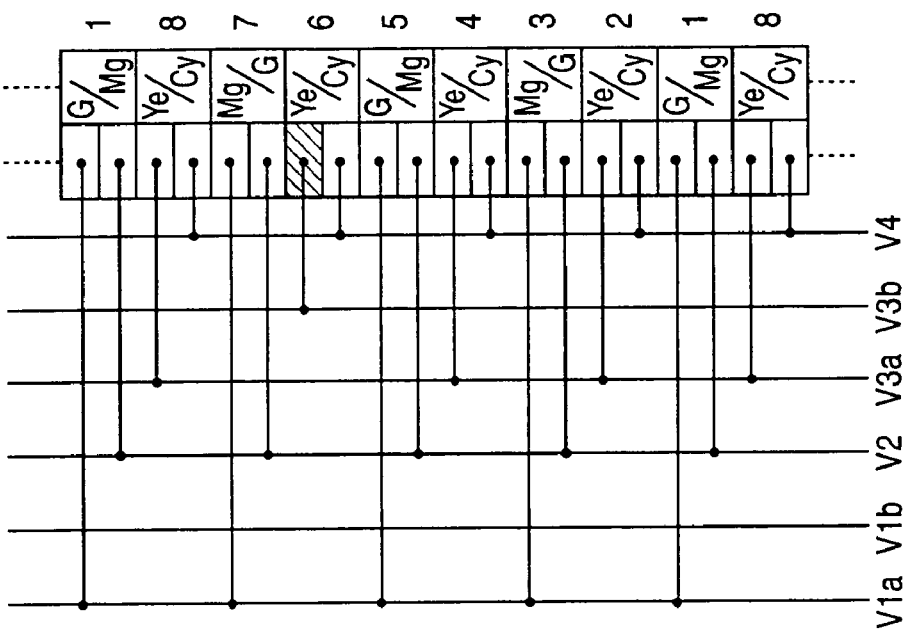
FIG. 18(A) is an illustrative view showing one part of the CCD imager shown in FIG. 17.
Figure 18B:
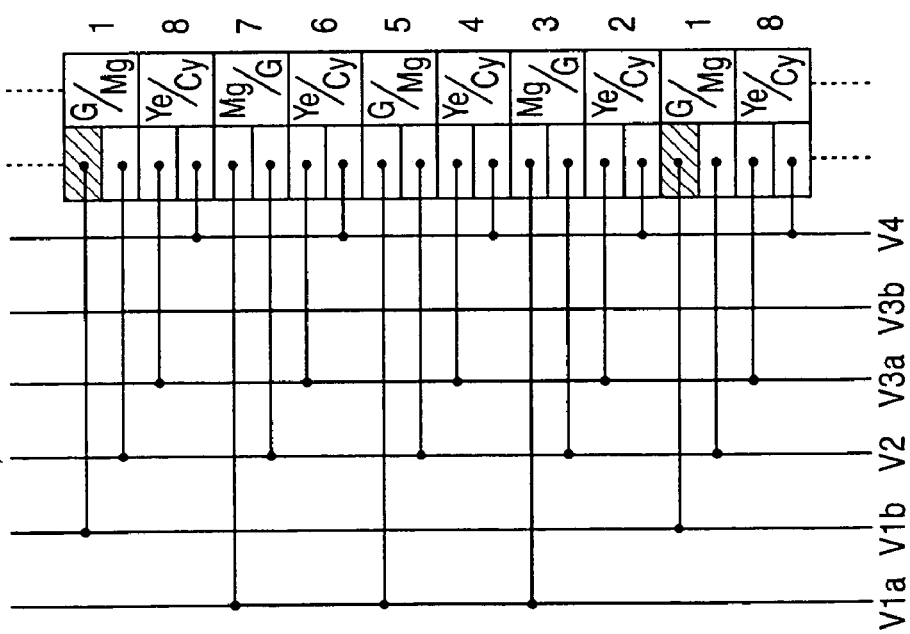
FIG. 18(B) is an illustrative view showing another part of the CCD imager shown in FIG. 17.

As shown in FIG. 18(A), on rows 1 and 2 a drive pulse V1b is applied only to the G/Mg pixels on line 1. Also, on rows 3 and 4 a drive pulse V3b is supplied only to the Ye/Cy pixels on line 6, as shown in FIG. 18(B).

The drive pulses V1a, V1b, V2, V3a, V3b and V4 vary as shown in FIG. 19(A), similarly to those of other embodiments. Because the drive pulse V1b is supplied only to line 1 on rows of 1 and 2, charges are read out of these rows as shown in FIG. 19(B). Also, because a drive pulse V3b is supplied only to the line 6 on the rows 3 and 4, charges are read out of these rows as shown in FIG. 19(C). The read charges are vertically transferred in a separate fashion.

Each time the pixel signals read out of each block are accumulated onto a horizontal transfer register, i.e. each time vertical transfer by 8 lines has been completed, drive pulses H1 and H2 shown in FIG. 4(B) are applied to the horizontal transfer register. Responsive to these drive pulses H1 and H2, the pixel signals are transferred in a horizontal direction. This means that 4 pixels of pixel signals created in each block are horizontally transferred in a collective fashion. The signal processing circuit 34a performs similar interpolation to that FIG. 1 embodiment. As a result, thinned-out image data is created that each pixel has all the color components.

According to this embodiment, because each block requires only once horizontal transfer, it is possible to reduce a time required to read out pixel signals as compared to the conventional.

Figure 20:
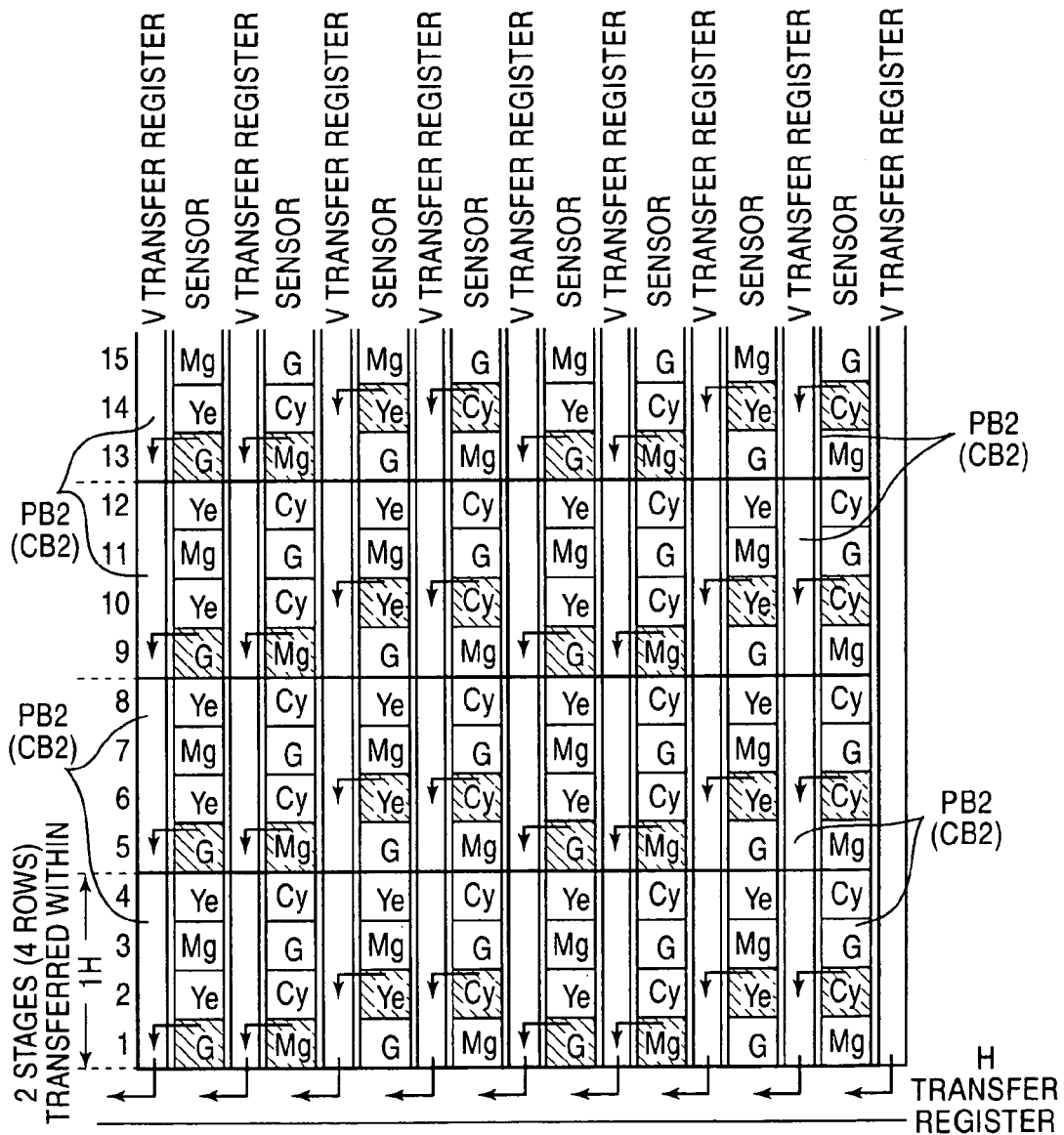
FIG. 20 is an illustrative view showing operation of another CCD imager.
Figure 21:
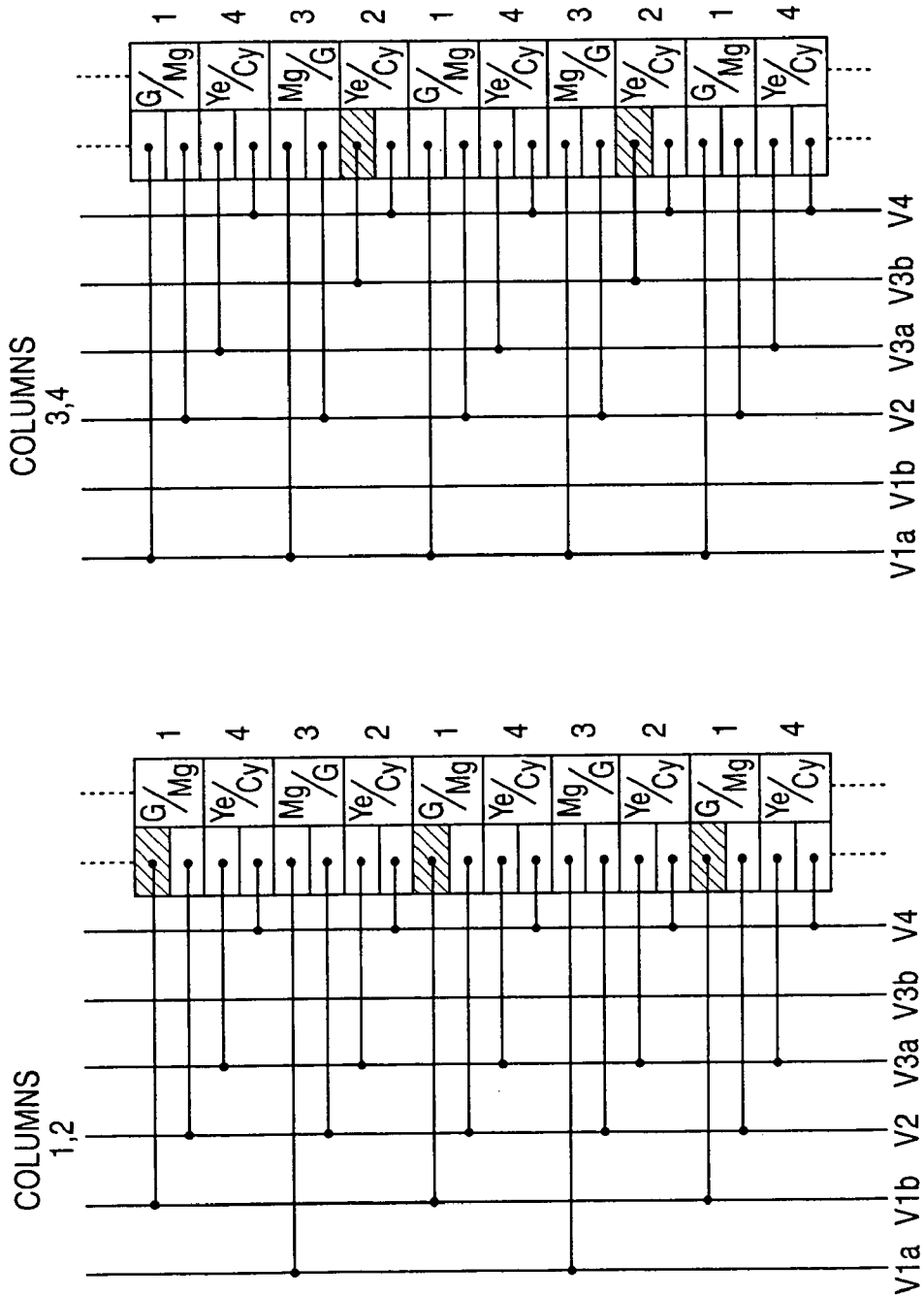
FIG. 21(A) is an illustrative view showing one part of the CCD imager shown in FIG. 20.
FIG. 21(B) is an illustrative view showing another part of the CCD imager shown in FIG. 20.
Figure 22:
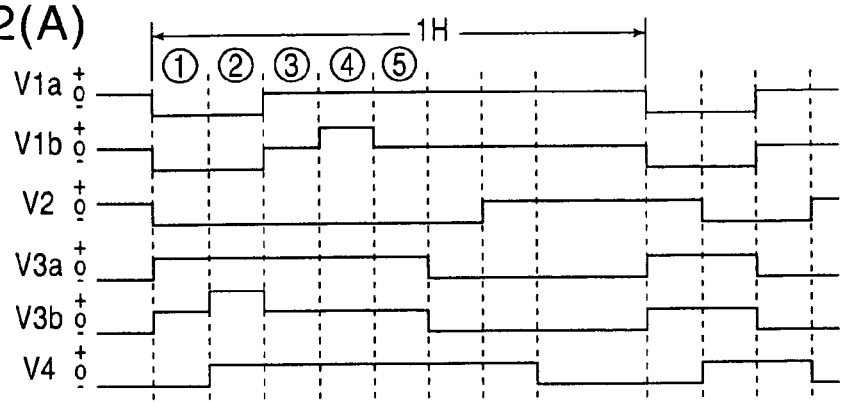
FIG. 22(A) is a timing chart showing operation of drive pulses.
FIG. 22(B) is an illustrative view showing a state of charge transfer.
FIG. 22(C) is an illustrative view showing a state of charge transfer.

FIG. 20 to FIG. 22 show another modification of a CCD imager 16, which is also mounted with a complementary color filter 16b. It is considered in this embodiment that the complementary color filter 16b is a gathering of color blocks CB2 each having 4 lines×4 rows while the CCD imager 16 is a gathering of pixel blocks PB2 corresponding to the color blocks CB2. In each block, on line 1 pixel signals are read from rows 1 and 2 while on line 2 pixel signals are read from rows 3 and 4. The read pixel signals each have color components G, Mg, Ye and Cy. The pixel signals thus configured are transferred in a vertical direction. At a time that 4 pixel signals are collected on a horizontal transfer register, i.e. when vertical transfer by 4 lines has been completed, the pixel signals are horizontally transferred in a collective fashion. As a result, the pixel signals outputted in once horizontal transfer repeatedly contain color components G, Mg, Ye and Cy.

As shown in FIG. 21(A), on rows 1 and 2 a drive pulse V1b is applied to the G/Mg pixels on line 1 while a drive pulse V1a is to the Mg/G pixels on line 3. Also, as shown in FIG. 21(B), on rows 3 and 4 a drive pulse V3b is supplied to the Ye/Cy pixels on line 2 while a drive pulse V3a is to the Ye/Cy pixels on line 4.

The drive pulses V1a, V1b, V2, V3a, V3b and V4 vary as shown in FIG. 22(A), similarly to those in the other embodiments. With such drive pulses, on rows 1 and 2 charges are read only from line 1 as shown in FIG. 22(B) while on rows 3 and 4 charges are read only from line 2 as shown in FIG. 22(C). The read charges are vertically transferred in a separate fashion, and delivered to a horizontal transfer register. Horizontal transfer is carried out each time vertical transfer by 4 lines has been completed. As a result, 4 pixels of pixel signals read out of a same block are collectively outputted. The output pixel signals are subjected to interpolation by the signal processing circuit 34. Thus, thinned-out image data is created that each pixel has all the color components.

According to this embodiment, there is increase in time to read pixel signals because of increase in the number of times of horizontal transfers. It is however possible to improve twice thinned-out image signal vertical resolution as compared to the conventional.

Figure 23:
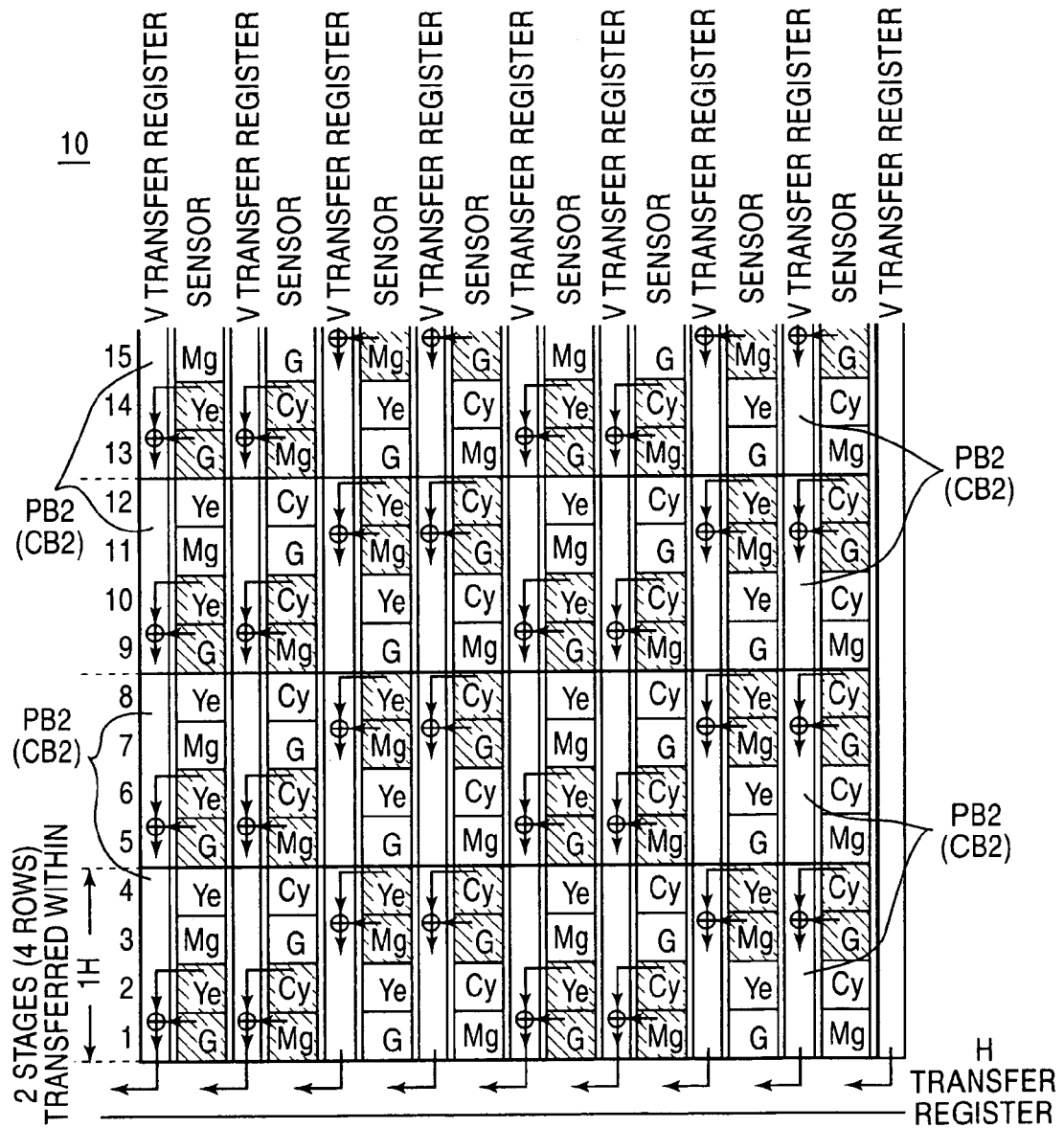
FIG. 23 is an illustrative view showing operation of another CCD imager.
Figure 24:
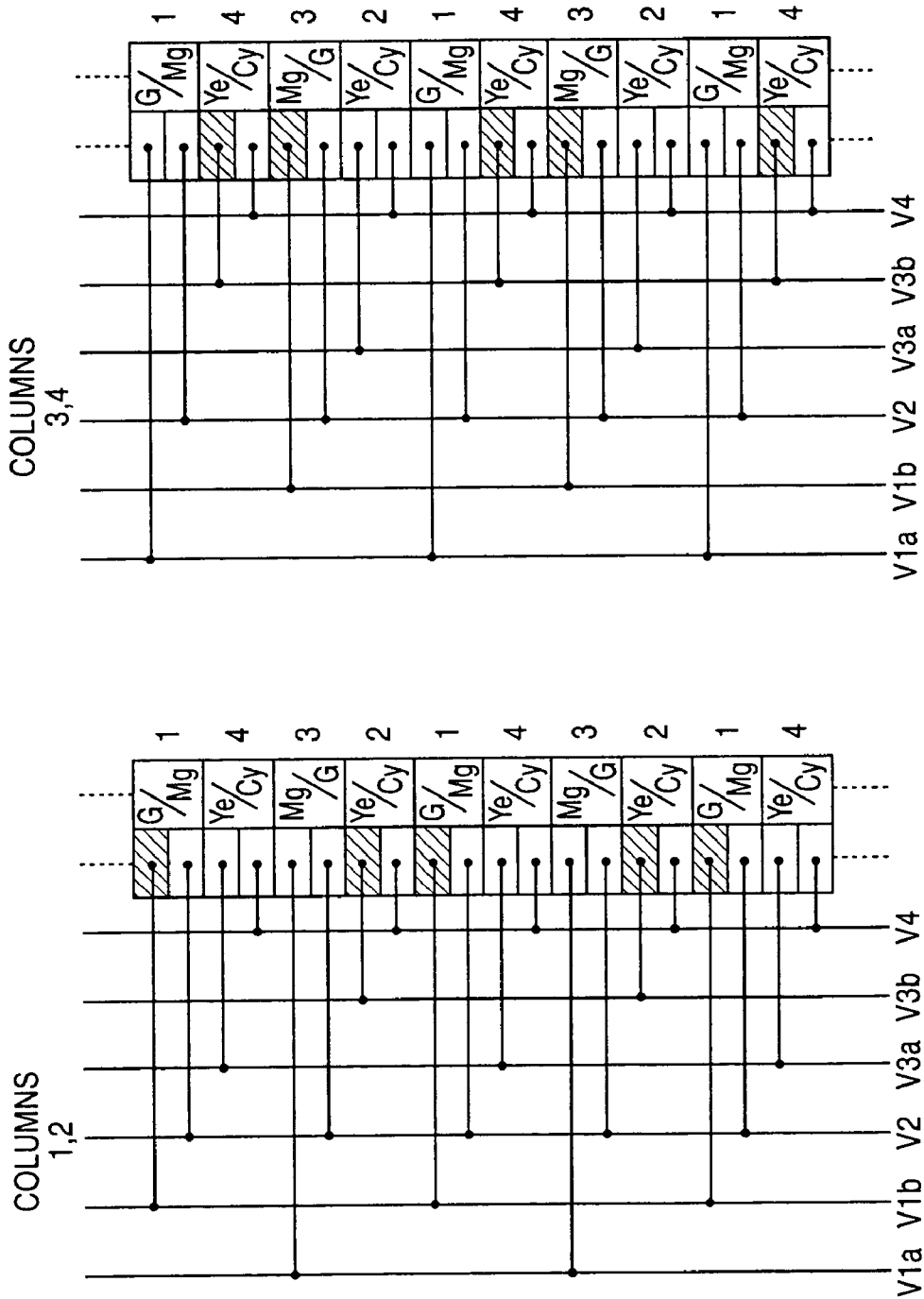
FIG. 24(A) is an illustrative view showing one part of the CCD imager shown in FIG. 23.
FIG. 24(B) is an illustrative view showing another part of the CCD imager shown in FIG. 23.
Figure 25:
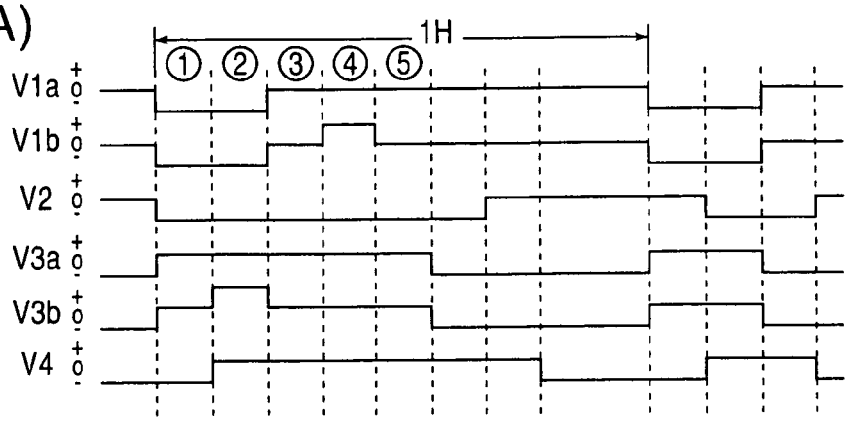
FIG. 25(A) is a timing chart showing operation of drive pulses.
FIG. 25(B) is an illustrative view showing a state of charge transfer.
FIG. 25(C) is an illustrative view showing a state of charge transfer.

FIG. 23 to FIG. 25 show another modification of a CCD imager 16, which is also mounted with a complementary color filter 16b. It is considered that the complementary color filter 16b is a gathering of color blocks CB2 each having 4 lines×4 rows while the CCD imager 16 is a gathering of corresponding pixel blocks PB2 to the color blocks CB2. In each block, on lines 1 and 2 pixel signals are read from rows 1 and 2 while on lines 3 and 4 pixel signals are read from rows 3 and 4. On row 1, G and Ye pixel signals are obtained wherein both the pixel signals are mixed with each other during reading out. On row 2, Mg and Cy pixel signals are read out wherein these pixel signals are mixed with each other during reading out. Similarly, on the row 3 Mg and Ye pixel signals are obtained, and on row 4 G and Cy pixel signals are obtained. Then, the pixel signals on a same row are mixed with each other. The pixel signals thus mixed are delivered to the horizontal transfer register. When vertical transfer by 4 lines has been completed, these pixel signals are horizontally transferred in a collective fashion. The pixel signals outputted in once horizontal transfer include repetitively color components (G+Ye), (Mg+Cy), (Mg+Ye) and (G+Cy).

As shown in FIG. 24(A), on rows 1 and 2 a drive pulse V1b is applied to the G/Mg pixels on line 1 while a drive pulse 3b is to the Ye/Cy pixels on line 2. Also, as shown in FIG. 24(B) on rows 3 and 4 a drive pulse V1b is supplied to the Mg/G pixels on line 3 while a drive pulse V3b is to the Ye/Cy pixels on line 4.

The drive pulses V1a, V1b, V2, V3a, V3b and V4 vary as shown in FIG. 25(A), similarly to those of the other embodiments. On rows 1 and 2, as shown in FIG. 25(B), charges are read from the line 2 in a period ② and charges are read from the line 1 in a period ⑤. Also, on the rows 3 and 4, as shown in FIG. 25(C), charges are read from the line 4 in a period ② and charges are read from the line 3 in a period ⑤. In a period ④ the drive pulses V1b, V3b and V4 becomes a zero level, and in a period ⑤ the drive pulse V1b changes from the zero level to a plus level. This causes mixing of charges on each row. The mixed charges are thereafter vertically transferred. Each time vertical transfer by 4 lines has been completed, the charges are horizontally transferred.

Differently from the other embodiments, the pixel signals outputted from the CCD imager 16 have different color components having been mixed. These pixel signals are interpolated by the signal processing circuit 34b with a result that thinned-out image data is created that each pixel has all the color components. The signal processing circuit 34b creates YUV data as follows. Y data is determined by equation 1, U data is by equation 2, and V data is by equation 3.

$$Y = \{(G + Ye) + (Mg + Cy) + (Mg + Ye) + (G + Cy)\}/4 \quad \text{[Equation 1]}$$
$$= \{(G + G + G) + (R + B + B + G) + (R + B + R + G) + (G + B + G)\}/4$$
$$= (4R + 6G + 4B)/4$$

$$U = \{(Mg + Ye) - (G + Cy)\} \quad \text{[Equation 2]}$$
$$= \{(R + B + R + G) - (G + B + G)\}$$
$$= 2R - G$$

$$V = \{(G + Ye) - (Mg - Cy)\} \quad \text{[Equation 3]}$$
$$= \{(G + G + R) - (R + B + B + G)\}$$
$$= G - 2B$$

According to this embodiment, there is increase in time to read out pixel signals due to increase in the number of times of horizontal transfers. It is however possible to improve twice the vertical resolution of a thinned-out image signal. Incidentally, although this embodiment was explained using the complementary color filter 16b with 2×4 matrixes, the pixel to be read out is in a 2×2 matrix form and, accordingly, the complementary color filter 16a may be used in place of the complementary color filter 16b. Also, although in this embodiment pixel mixing was carried out over the vertical transfer register, pixel mixing may be conducted on the horizontal transfer registers.

Figure 26:
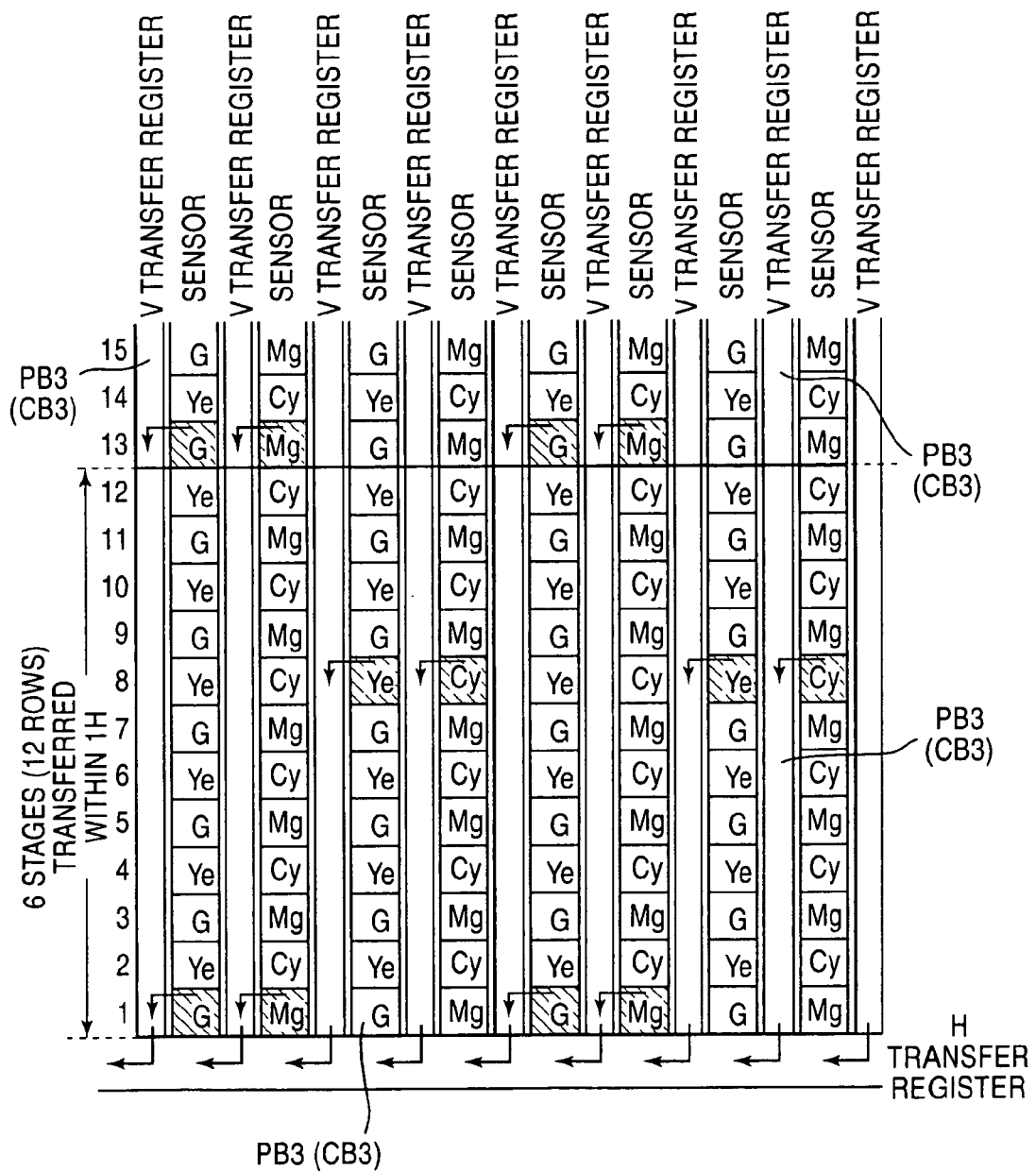
FIG. 26 is an illustrative view showing operation of still another CCD imager.
Figure 27B:
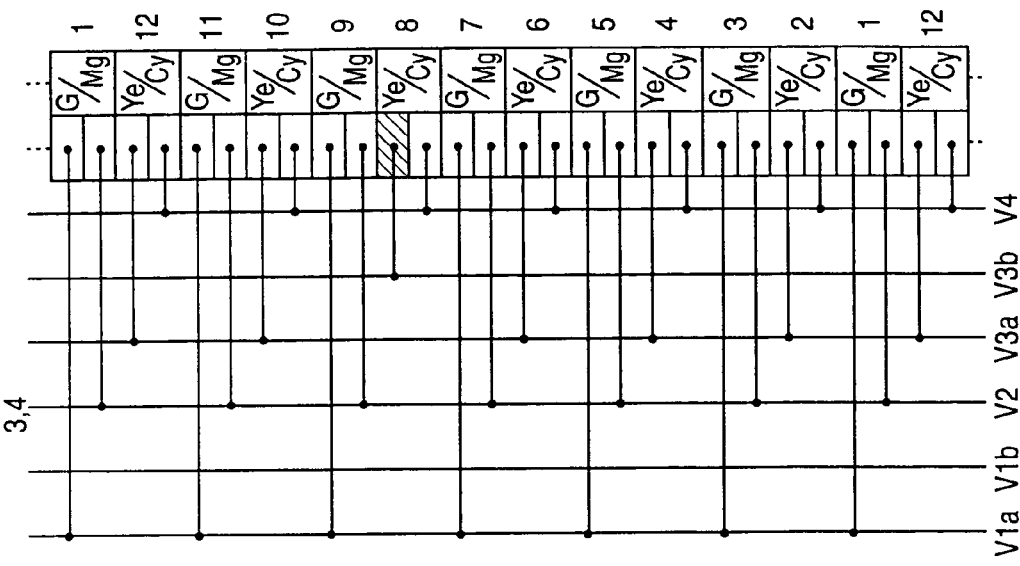
FIG. 27(B) is an illustrative view showing another part of the CCD imager shown in FIG. 26.
Figure 27A:
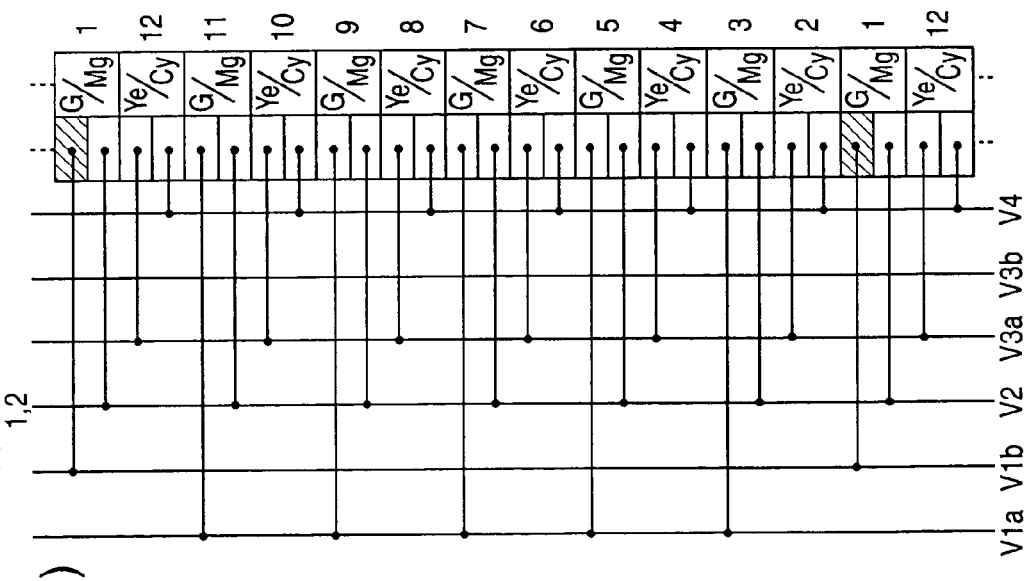
FIG. 27(A) is an illustrative view showing one part of the CCD imager shown in FIG. 26.
Figure 28A:
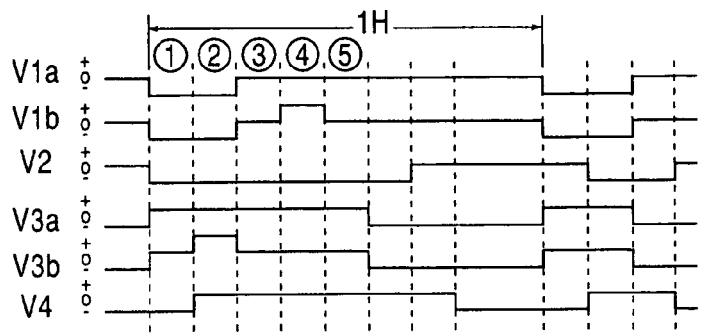
FIG. 28(A) is a timing chart showing operation of drive pulses.

Referring to FIG. 26 to FIG. 28, another modification of a CCD imager 16 is mounted with a complementary color filter 16a of FIG. 2. It is considered in this embodiment that the complementary color filter 16a is a gathering of color blocks CB3 each having 12 lines×4 rows while the CCD imager 16 is a gathering of corresponding pixel blocks PB3 to the color blocks CB3. In each block, on line 1 pixel signals are read from rows 1 and 2, and on line 8 pixel signals are read from rows 3 and 4. As a result, each read pixel signal has color components G, Mg, Ye and Cy. The pixel signals thus configured are vertically transferred. When vertical transfer by 12 lines has been completed, the pixel signals are horizontally transferred in a collective fashion. The pixel signals outputted in once horizontal transfer contain color components G, Mg, Ye and Cy in this order.

For rows 1 and 2 in each block, a drive pulse V1b is applied to the G/Mg pixels on the line 1, as shown in FIG. 27(A). Meanwhile, on the rows 3 and 4 a drive pulse V3b is supplied to the Ye/Cy pixels on line 8.

Figure 28B:
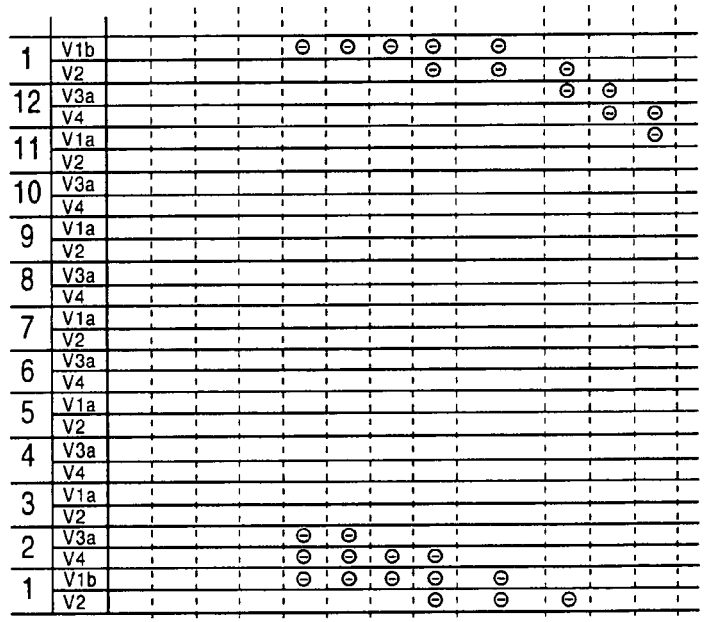
FIG. 28(B) is an illustrative view showing a state of charge transfer.
Figure 28C:
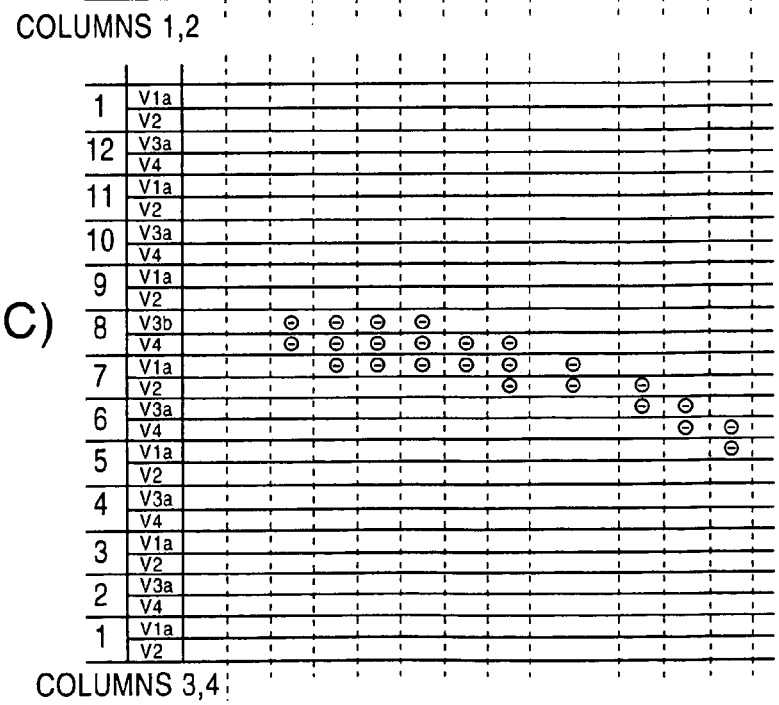
FIG. 28(C) is an illustrative view showing state of charge transfer.

The drive pulses V1a, V1b, V2, V3a, V3b and V4 vary as shown in FIG. 34(A), similarly to those of the other embodiments. Due to the drive pulse V1b applied to the G/Mg pixels on line 1 of rows 1 and 2, charges are read from line 1, as shown in FIG. 28(B). Also, due to the drive pulse V3b applied to the Ye/Cy pixels on the line 8 of rows 3 and 4, charges are read from line 8, as shown in FIG. 28(C).

The read charges are vertically transferred in a separate fashion, and then horizontally transferred in timing of once every 12 line according to the drive pulses H1 and H2. As a result, the pixel signals having G, Mg, Ye and Cy read out from each block are collectively outputted. The pixel data corresponding to the output pixel signals is interpolated by the signal processing circuit 34a. As a result, thinned-out image data is created that each pixel has all the color components.

According to this embodiment, each block requires only once horizontal transfer process and furthermore each block is constituted by an increased number of vertical pixels. It is therefore possible to greatly reduce a time required to read out pixel signals.

Figure 29:
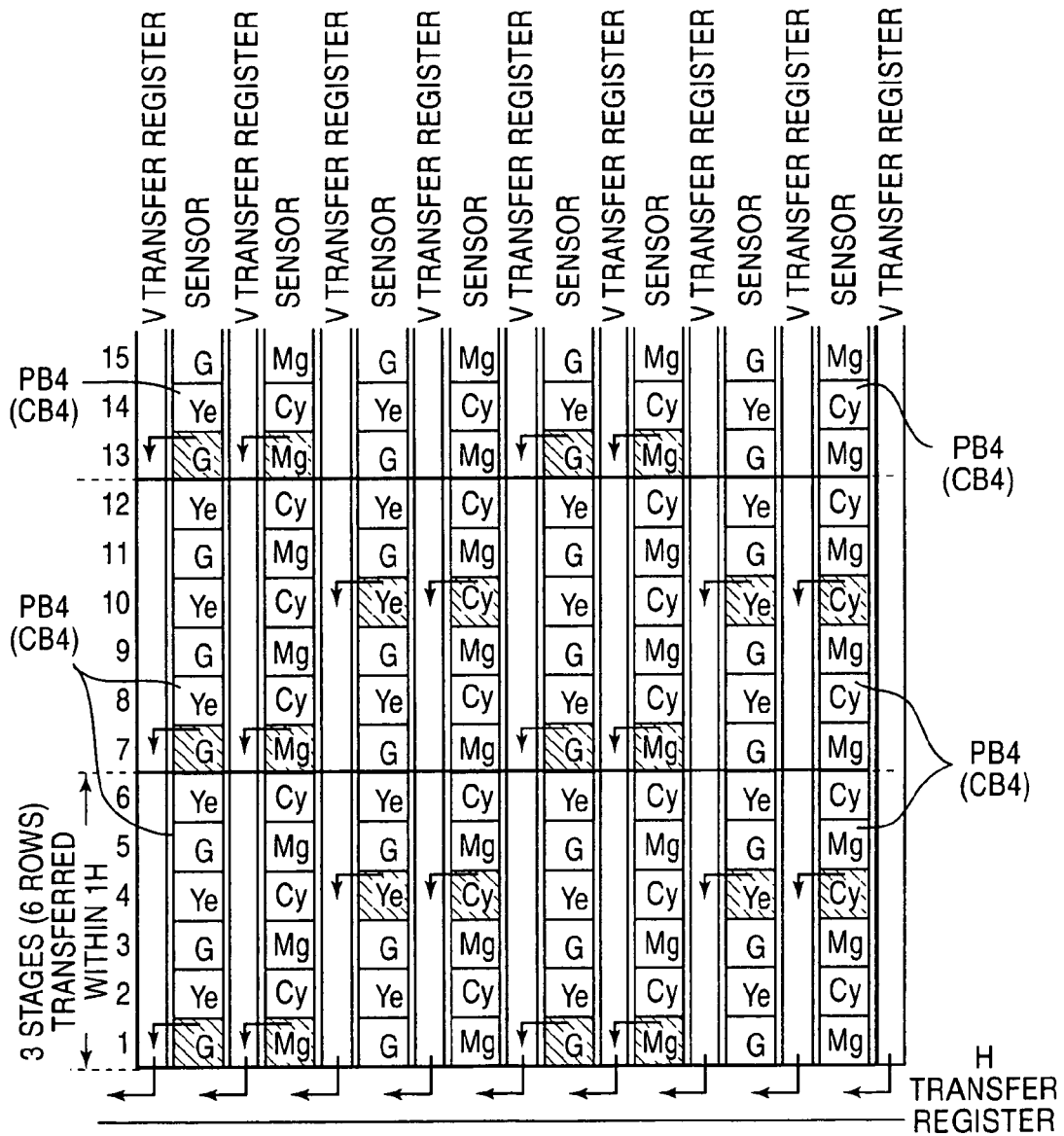
FIG. 29 is an illustrative view showing operation of another CCD imager.

Referring to FIG. 29 to FIG. 31, another modification of a CCD imager 16 is mounted with a complementary color filter 16a of FIG. 2. It is considered in this embodiment that the complementary color filter 16a is a gathering of color blocks CB4 each having 6 lines×4 rows while the CCD imager 16 is a gathering of corresponding pixel blocks PB4 to the color blocks CB4. In each block, on line 1 pixel signals are read out from rows 1 and 2, and on line 4 pixel signals are read from rows 3 and 4. As a result, the read pixel signals each possess color components G, Mg, Ye and Cy. These pixel signals are vertically transferred. At a time that vertical transfer by 6 lines has been completed, the pixel signals are horizontally transferred in a collective fashion. Similarly to the embodiment of FIG. 26 to FIG. 28, the pixel signals outputted in one horizontal transfer contain color components G, Mg, Ye and Cy in this order.

For rows 1 and 2 in each block, a drive pulse V1b is applied to the G, Mg pixels on line 1, as shown in FIG. 30(A). On the other hand, for rows 3 and 4 a drive pulse V3b is supplied to the Ye/Cy pixels on line 4, as shown in FIG. 30(B).

Figure 31A:
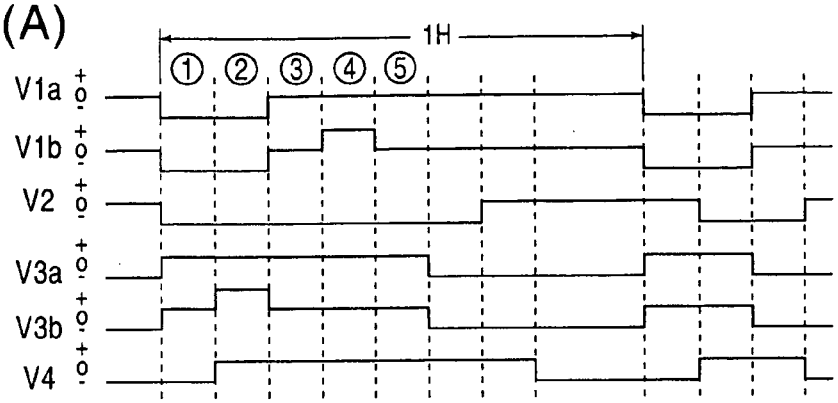
FIG. 31(A) is a timing chart showing operation of drive pulses.
Figure 31B:
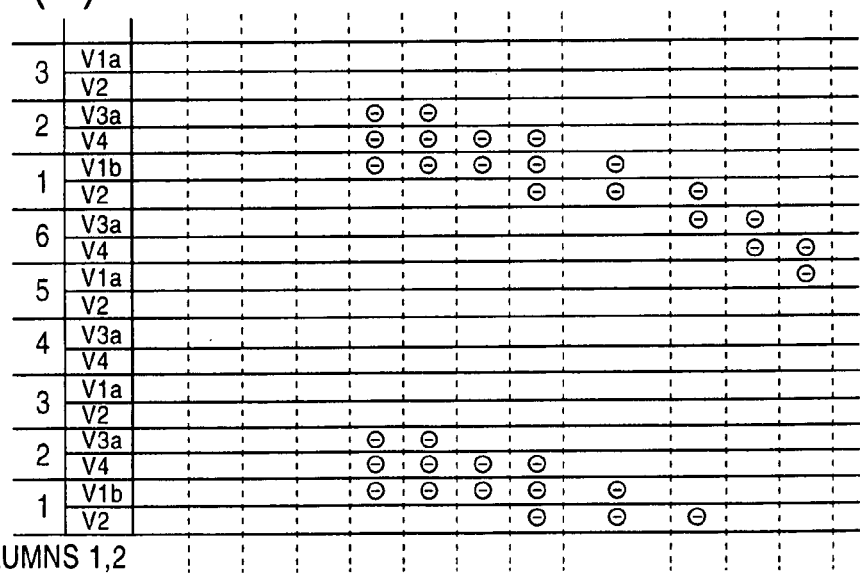
FIG. 31(B) is an illustrative view showing a state of charge transfer.
Figure 31C:
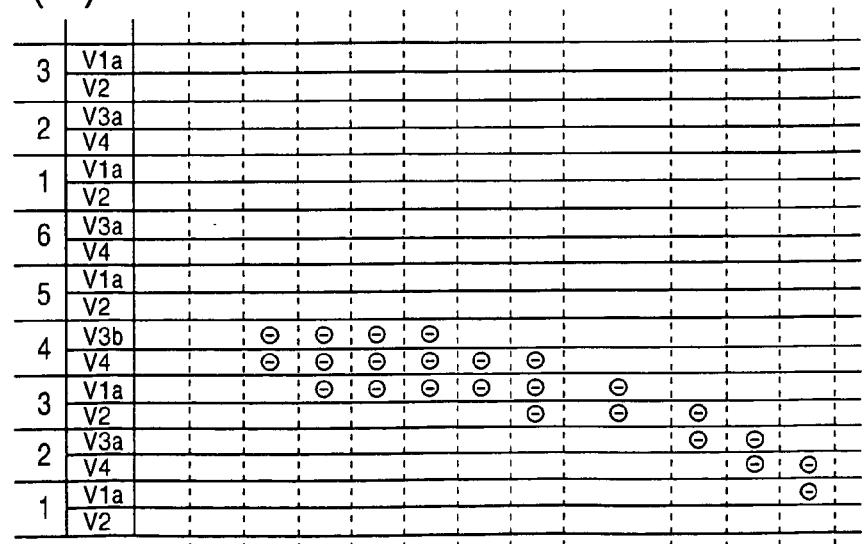
FIG. 31(C) is an illustrative view showing a state of charge transfer.
Figure 32:
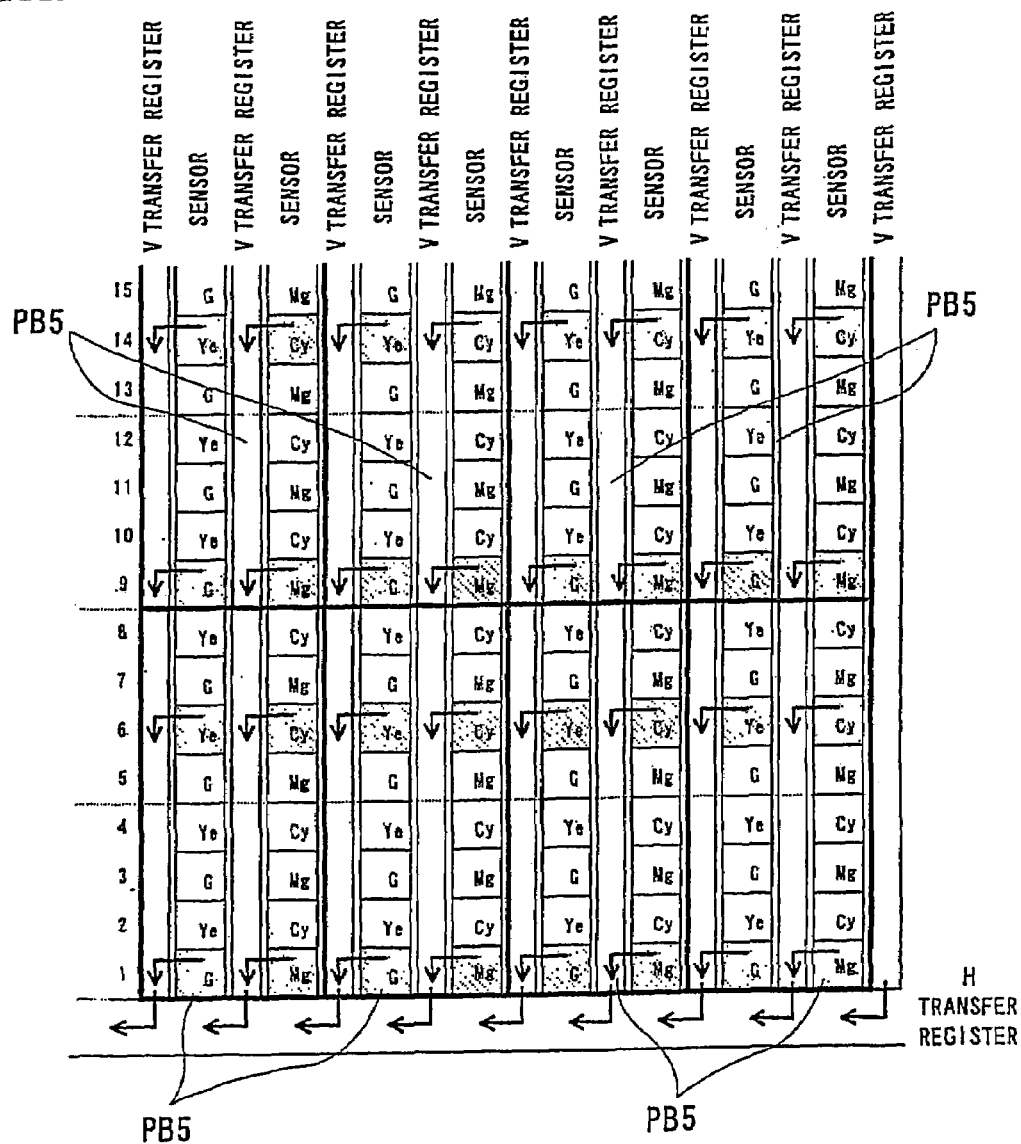
FIG. 32 is an illustrative view showing operation of a conventional CCD imager.

The drive pulses V1a, V1b, V2, V3a, V3b and V4 vary as shown in FIG. 31(A), similarly to those of the other embodiments. Due to the drive pulse V1b applied to the G/Mg pixels on the line 1 of the rows 1 and 2, charges are read from the line 1 as shown in FIG. 31(B). Also, due to the drive pulse V3b applied to the Ye/Cy pixels on line 4 of the rows 3 and 4, charges are read from line 4, as shown in FIG. 31(C).

The read charges are vertically transferred in a separate fashion, and then vertically transferred in timing of once every 6 line. As a result, the pixel signals having G, Mg, Ye and Cy corresponding to the blocks are collectively outputted. The pixel data corresponding to the output pixel signals is interpolated by the signal processing circuit 34a similarly to the embodiment of FIG. 26 to FIG. 28. As a result, thinned-out image data is created that each pixel has all the color components.

According to this embodiment, each block requires only once horizontal transfer. It is therefore possible to reduce a time required to read out pixel signals. Also, a returning characteristic is given constant because of an even spacing between the line that G and Mg pixel signals are to be read and the line that Ye and Cy pixel signals are to be read. Thus filtering is facilitated.

Incidentally, although this embodiment used the complementary color filter 16a, the use of a complementary color filter 16b will realize the similar function. Also, although in this embodiment the number of pixel signals to be read out of each row included in each block is determined one, a plurality of pixel signals may be read from each row provided that a distance between the lines from which the pixel signals are to be read. That is, it may be considered, without changing the pixels to be read out, that the complementary color filter 16a is a gathering of color blocks CB3 each having 12 lines×4 rows while the CCD imager 16 is a gathering of corresponding pixel blocks PB3 to the color blocks CB3.

Furthermore, in the above nine embodiments, reading with thinning-out is implemented only in the camera mode. It is however needless to say that this invention is applicable also for a case of recording thinned-out image data.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. An imaging device, comprising: a color filter formed by a plurality of color elements each of which has any one of N colors, where N is an integer greater than one; an imager having a plurality of pixels; and a provider for providing a drive pulse to said imager, wherein the plurality of color elements are divided into a plurality of color blocks each of which has a plurality of horizontal color element rows and N of vertical color element columns, the plurality of pixels are divided into a plurality of pixel blocks each of which has a plurality of horizontal pixel rows and N vertical pixel columns, the N vertical color element columns respectively include N color elements which are different in colors with each other, the plurality of horizontal pixel rows respectively correspond to the plurality of horizontal color element rows, the N vertical pixel columns respectively correspond to the N vertical color element columns, and the drive pulse includes a reading pulse for reading pixel signals from the N vertical pixel columns in a thinning out manner, a vertical transfer pulse for transferring the pixel signals read by the reading pulse in a vertical direction, and a horizontal transfer pulse for transferring the pixel signals transferred by the vertical transfer pulse in a horizontal direction every time a vertical transfer corresponding to all of the plurality of horizontal pixel rows is performed without combining any of the pixel signals prior to horizontal transfer, and the color elements corresponding to pixels selected for reading of the pixel signals from the N vertical pixel columns have different colors for each vertical pixel column.

2. An imaging device according to claim 1, wherein one pixel of pixel signal is read out from one vertical pixel column forming one pixel block.

3. An imaging device according to claim 1, wherein each of the N vertical color element columns includes two or more of color elements which have the same color, and a plurality of pixels of pixel signals are read out from each of the N vertical pixel columns.

4. An imaging device according to claim 1, wherein the pixel signals are read out from each of the plurality of pixel blocks such that intervals of the horizontal pixel rows each of which includes pixels for reading becomes equal.

5. An imaging device according to claim 1, wherein the N colors are green, magenta, yellow and cyan, color elements of the green and the magenta are alternately arranged on one of odd number of horizontal color element rows and even number of horizontal color elements rows, and color elements of the yellow and cyan are alternately arranged on another of the odd number of horizontal color element rows and the even number of horizontal color element rows.

6. A digital camera comprising an imaging device according to any one of claims 1 to 5.

* * * * *